(12) United States Patent
Stiles

(10) Patent No.: US 7,457,429 B2
(45) Date of Patent: Nov. 25, 2008

(54) LAMINATED MOTOR STRUCTURE FOR ELECTROMAGNETIC TRANSDUCER

(75) Inventor: Enrique M. Stiles, Imperial Beach, CA (US)

(73) Assignee: STEP Technologies Inc., Minneapolis, MN (US)

( * ) Notice: Subject to any disclaimer, the term of this patent is extended or adjusted under 35 U.S.C. 154(b) by 347 days.

(21) Appl. No.: 10/750,468

(22) Filed: Dec. 31, 2003

(65) Prior Publication Data

US 2004/0213430 A1    Oct. 28, 2004

(51) Int. Cl.
*H04R 9/02* (2006.01)
(52) U.S. Cl. .................................. 381/414; 381/412
(58) Field of Classification Search ................ 381/396, 381/400, 412, 414, 419, 420
See application file for complete search history.

(56) References Cited

U.S. PATENT DOCUMENTS 2,894,182 A * 7/1959 Zuerker et al. .............. 335/296
3,922,501 A * 11/1975 Yamamuro .................. 381/414

* cited by examiner

*Primary Examiner*—Brian Ensey
(74) *Attorney, Agent, or Firm*—Richard C. Calderwood

(57) ABSTRACT

An electromagnetic transducer such as an audio speaker having at least one of the soft magnetic components of its motor assembly constructed as a laminated structure of electrically insulated magnetically conductive sections. Eddy currents, which would have been induced in a monolithic component in response to an electrical signal applied to the voice coil, are prevented or significantly reduced by the electrical insulation material between the sections of the laminated component. The transducer produces less heat, is less susceptible to flux modulation, and has increased power handling and reduced distortion.

42 Claims, 18 Drawing Sheets

FIG. 1 - prior art

FIG. 2 - prior art

LAMINATED MOTOR STRUCTURE FOR ELECTROMAGNETIC TRANSDUCER

RELATED APPLICATIONS

This application is related to and claims filing date benefit of a co-pending application Ser. No. 10/289,109 entitled "Push-Push Multiple Magnetic Air Gap Transducer" filed Nov. 4, 2002, a co-pending application Ser. No. 10/289,080 entitled "Electromagnetic Transducer Having a Low Reluctance Return Path" filed Nov. 4, 2002, a co-pending application Ser. No. 10/337,035 entitled "Electromagnetic Transducer Having a Hybrid Internal/External Magnet Motor Geometry" filed Jan. 6, 2003, and a co-pending application Ser. No. 10/423,726 entitled "Tube Geometry Motor for Electromagnetic Transducer" filed Apr. 25, 2003, all by this inventor.

BACKGROUND OF THE INVENTION

1. Technical Field of the Invention

This invention relates generally to electromagnetic transducers such as audio speakers, and more specifically to a motor structure for such, having one or more soft magnetic members with a laminated construction.

2. Background Art

FIG. 1 illustrates a conventional speaker 10 with an external magnet geometry motor structure 12 driving its diaphragm assembly 14. The motor structure includes a pole plate 16 style yoke, made of soft magnetic material and including a back plate 18 and a pole piece 20 that are either magnetically coupled or of integral construction. The pole plate may optionally include a ventilation hole 22 for depressurizing the diaphragm assembly. One or more external ring hard magnets 24 are magnetically coupled to the back plate. A top plate 26 of soft magnetic material is magnetically coupled to the hard magnets. A magnetic air gap 28 is formed between the top plate and the pole piece.

The diaphragm assembly includes a basket 30 which is mechanically coupled to the motor assembly to support the other, moving parts of the diaphragm assembly. A diaphragm 32, sometimes referred to as a cone, is coupled to the basket by a flexible suspension component known as a surround 34. A voice coil former or bobbin 36 is mechanically coupled to the diaphragm, and is coupled to the basket by a flexible suspension component known as a spider 38. The surround and spider allow the bobbin and diaphragm to move axially with respect to the motor structure, but prevent, as much as possible, their lateral movement and rocking. An electrically conductive voice coil 40 is wound around and mechanically coupled to the bobbin, and is disposed within the magnetic air gap of the motor structure. A dust cap 42 is coupled to the diaphragm to seal the open end of the bobbin.

FIG. 2 illustrates a conventional speaker 50 with an internal magnet geometry motor structure 52 driving the diaphragm assembly 14. The motor structure includes a yoke or cup 54 of soft magnetic material. One or more internal hard magnets 56 are magnetically coupled to the cup, and an internal top plate 58 of soft magnetic material is magnetically coupled to the hard magnets, forming a magnetic air gap 60 between the top plate and the cup. The motor structure may be ventilated, as shown, or it may be unventilated and have disc magnets and a disc top plate, rather than the ring configuration shown.

Both the external magnet geometry motor structure of FIG. 1, and the internal magnet geometry motor structure of FIG. 2 are axisymmetric, meaning that they have a generally circular shape when viewed along their motors' respective axes.

In order to use larger magnets, it has previously been necessary to grow the motor structure in all radial directions, by making the diameter larger.

FIG. 15 illustrates the conventional external magnet motor structure 10 (of FIG. 1), shown in an isometric sectional view with multiple cutaways. The motor structure includes a pole plate including a back plate 18 and a pole piece 20. A pair of magnets 24 are magnetically coupled to the pole plate, and a top plate 26 is magnetically coupled to the magnets. The space between the inner diameter of the top plate and the pole piece defines a magnetic air gap 28.

One significant drawback in the prior art is that the alternating current in the voice coil (not shown) will induce eddy currents (denoted EC and shown in heavy, curved arrows) in various of the motor components, including the pole piece. These eddy currents cause inductive heating of the motor components through which they are carried. The eddy currents themselves cause magnetic fields (flux modulation) which tend to counteract the desired operation of the motor assembly, degrading sound quality, increasing distortion, and reducing high frequency output, by increasing the inductance of the transducer. Worse still, these effects become more pronounced, the harder the speaker is driven.

In the unrelated field of transformers, it is known to avoid eddy currents by fabricating the outer magnetic circuit core as a laminate, with multiple separate members coupled together, rather like plywood. Adjacent members are electrically insulated from each other, but are magnetically coupled to each other; the overall laminated structure is highly magnetically conductive, but is minimally electrically conductive. Ideally, the lamination should be perpendicular to the direction in which eddy currents would tend to be induced; that is, the eddy current paths will be interrupted by an electrical insulation layer between each magnetically conductive lamination.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The invention may be utilized in a variety of magnetic transducer applications, including but not limited to audio speakers, microphones, mechanical position sensors, actuators, and the like. For the sake of convenience, the invention will be described with reference to audio speaker embodiments, but this should be considered illustrative and not limiting.

Figure 1:
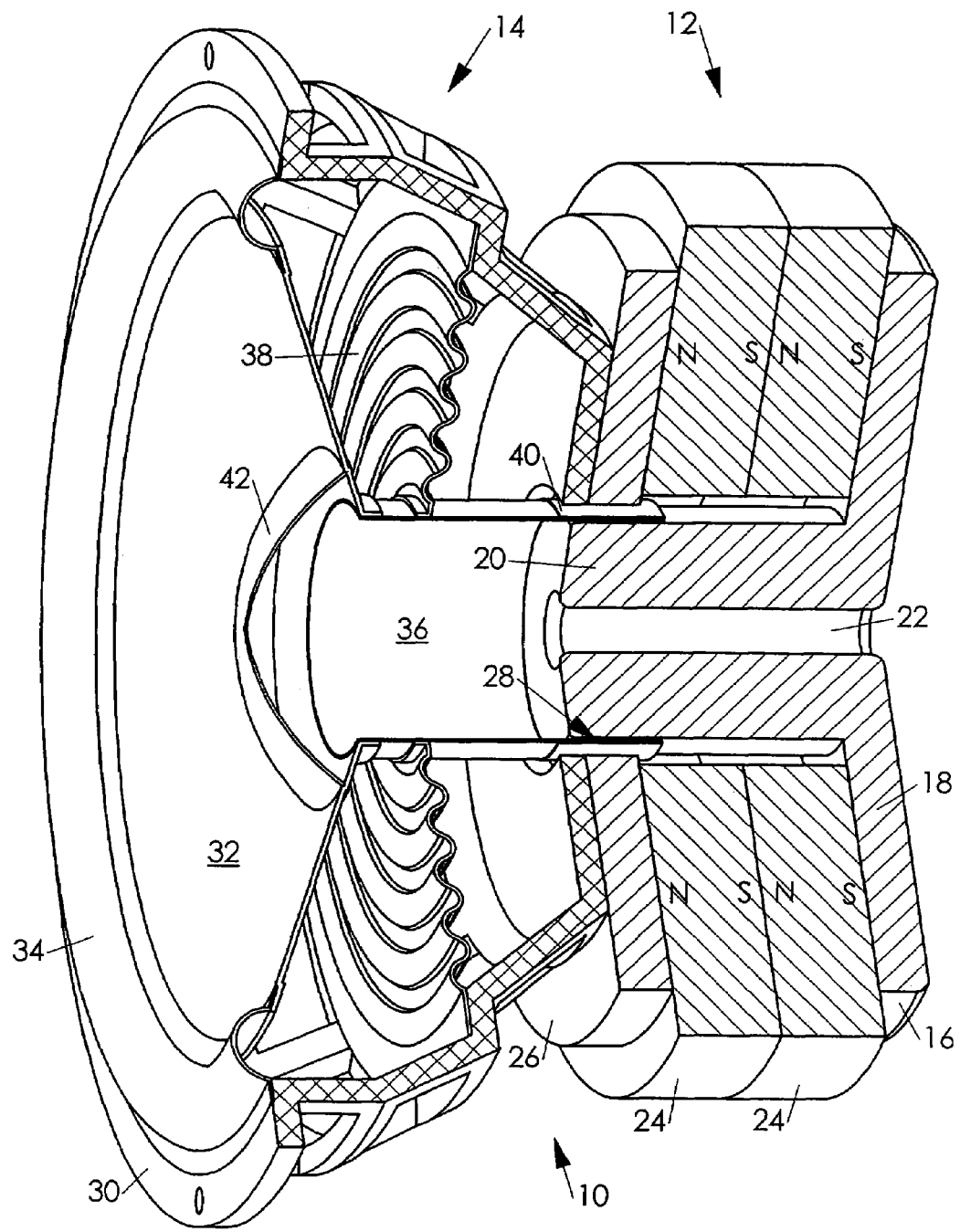
FIG. 1 shows a conventional external magnet geometry speaker according to the prior art.
Figure 2:
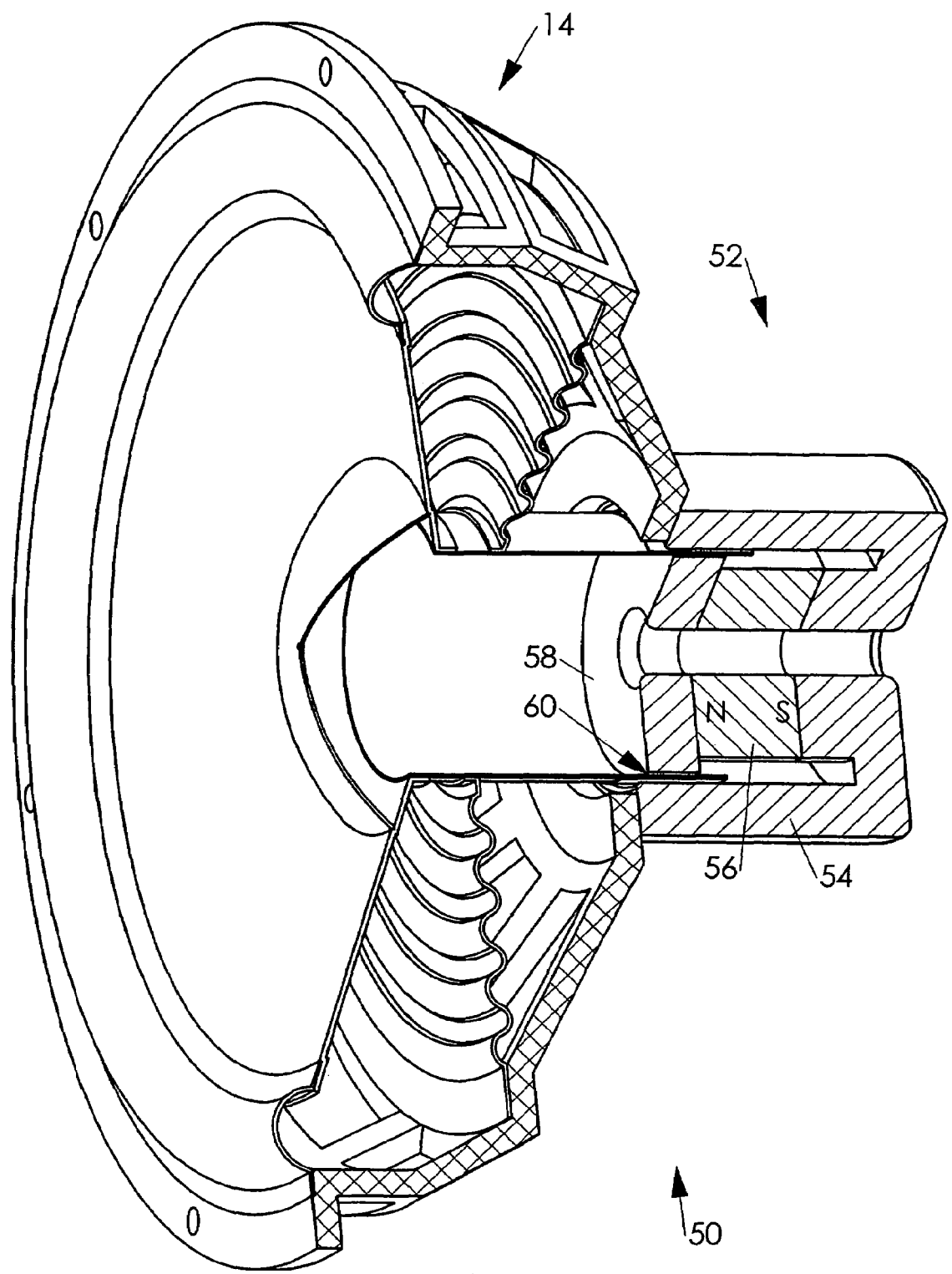
FIG. 2 shows a conventional internal magnet geometry speaker according to the prior art.
Figure 3:
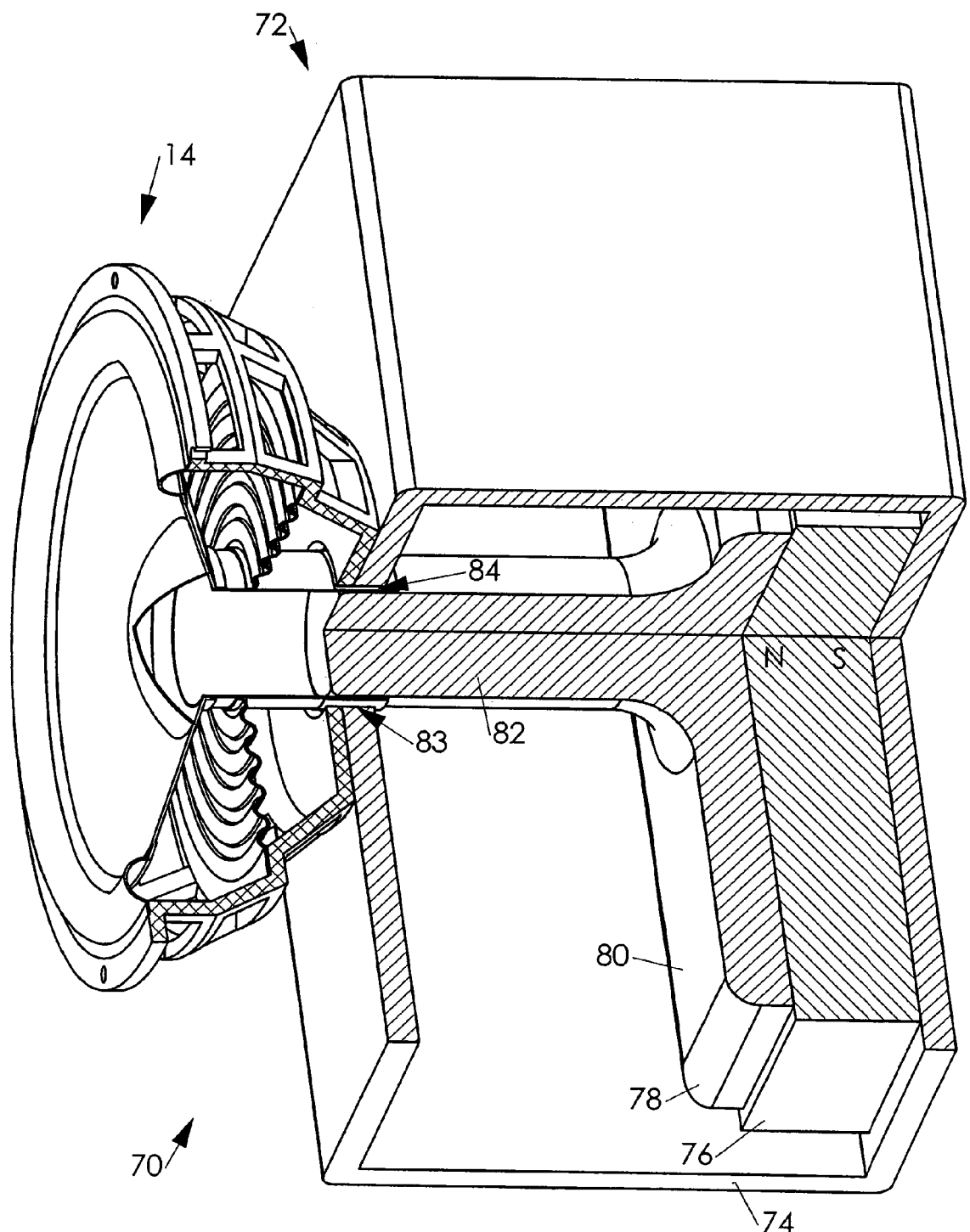
FIG. 3 shows a speaker having a tube geometry motor structure according to one embodiment of this invention.

FIG. 3 illustrates one embodiment of a speaker 70 having a tube geometry motor 72 driving a diaphragm assembly 14. The tube geometry motor is not axisymmetric. It includes a tube 74 which may have various aspect ratios and which is formed of soft magnetic material. Its cross-section may be substantially square, as shown, or it may have any of a wide variety of other shapes. The tube has an extruded axis, roughly vertical on the page as shown, along which the tube may be extruded during one mode of manufacturing. One or more hard magnets 76 are magnetically coupled to an interior surface of the tube. The hard magnet has a south pole face and a north pole face, through which the magnetic flux lines enter and exit the hard magnet. If there are plural hard magnets, they may be stacked (as shown in FIG. 1) to build up a thicker overall magnet, or they may be butted end-to-end to, in effect, create one larger overall magnet having increased pole face surface area. A pole plate 78 is magnetically coupled to the hard magnets. The pole plate advantageously includes a back plate 80 which has a back face which is magnetically coupled to a pole face of the hard magnets, and a pole piece 82 which extends through an air gap hole 83 in the opposite wall of the tube to define a magnetic air gap 84.

The pole piece and the back plate may be distinct components, or they may be a monolithic pole plate. In one such embodiment, the back plate has a threaded hole and the pole piece has a threaded end which engages the hole. Manufacturing of such a pole piece may be easier if there is no fillet transition from the pole piece to the back plate. One advantage of this two-component embodiment is that the back plate can be inserted into the tube, and the pole piece can then be inserted through the tube's magnetic air gap hole and coupled to the back plate, enabling the use of a pole plate whose overall height is too great to fit within the tube as a pre-assembled or monolithic pole plate.

Ideally, there should be some space between the sides of the magnets and the adjacent walls of the tube, to greatly reduce the tendency of magnetic flux to jump directly from the hard magnets to those walls, rather than traveling into the pole plate and over the magnetic air gap. For ease of assembly, the overall height of a monolithic pole plate, from the back surface which mates with the magnets to the end of the pole piece, should be shorter than the internal dimension of the tube, allowing the pole plate to be slid into position through an end of the tube, then moved (to the left in FIG. 3) far enough to allow the hard magnets to be slid in between the back plate and the tube's inner wall. Alternatively, the tube may be split into two components at the air gap hole, to allow for assembly without the pole plate having to fit through the tube. In some applications, it may be advantageous for the pole piece to extend slightly beyond the outer surface of the tube, after assembly, to maximize the symmetry of the magnetic flux fringing fields at the two ends of the magnetic air gap.

The open ends of the tube may be covered with magnetic shields (not shown) to contain stray magnetic flux. The shields may advantageously be vented to permit airflow to cool and depressurize the motor structure.

The tube motor structure offers significant cooling advantages. The long tube of the motor acts as a large heatsink with lots of exposed surface area. The open-ended tube, even with vented shields, enables airflow through the heart of the motor structure to a degree significantly greater than in conventional motor structures. Airflow through the tube may be enhanced by adding a fan or other forced air mechanism, especially in applications in which the ambient noise of such mechanisms are not unacceptable. In applications in which the noise might be unacceptable, cooling of the tube motor structure can be improved simply by placing the tube in a vertical orientation, in which it will act as a thermal convection chimney; as the voice coil heats the air inside the motor, the heated air will rise out the top of the tube, drawing cool air in the bottom end of the tube.

The hard magnet(s) have a pole face whose surface area is larger than the area of the air gap hole through which the pole piece extends. In some embodiments, the pole face surface area may be twice that of the air gap hole, or four, eight, or sixteen times, or any other amount. In some embodiments, the hard magnet (or the individual hard magnets of a conglomerate magnet) are too large to fit through the air gap hole.

Figure 4:
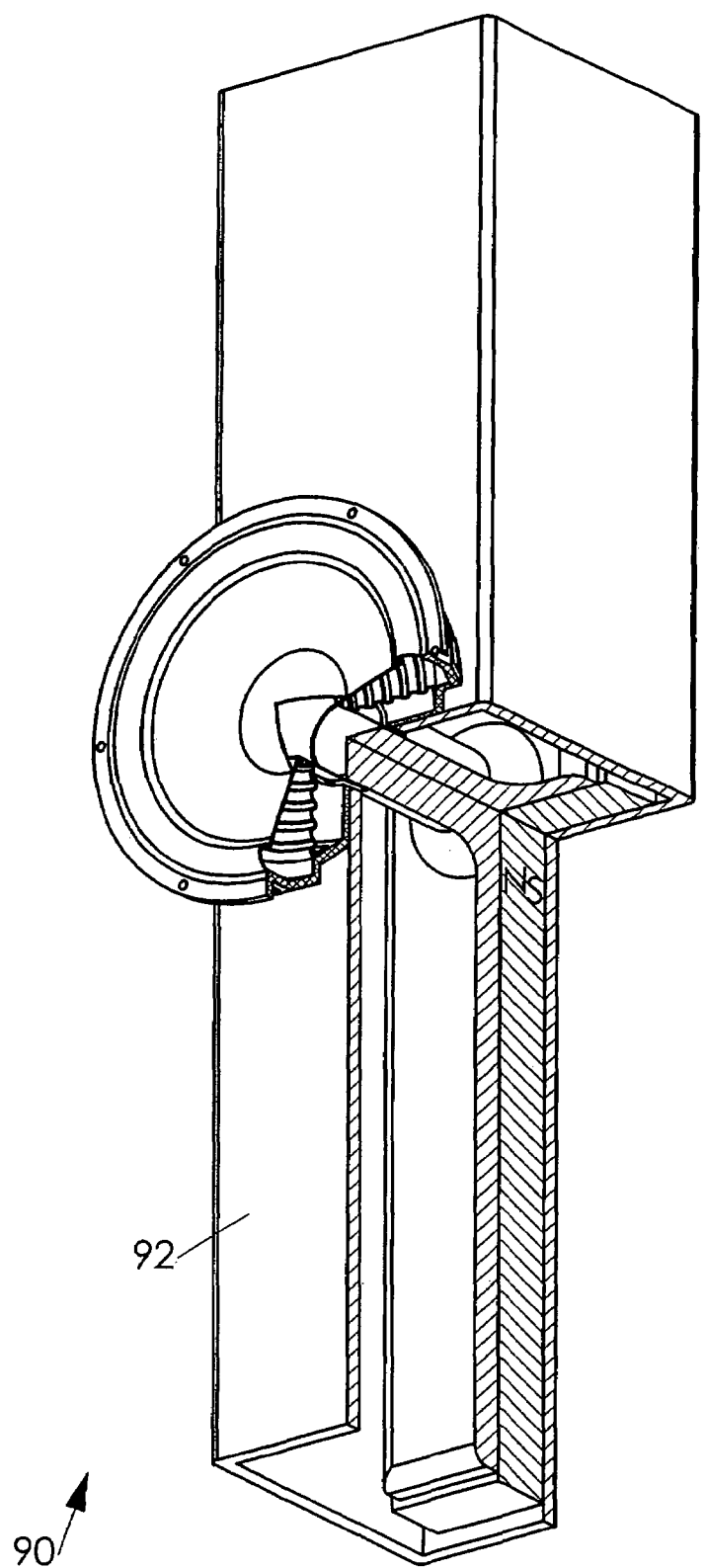
FIG. 4 shows a speaker having a greatly elongated tube geometry motor according to another embodiment of this invention.

FIG. 4 illustrates another embodiment of a speaker 90 having a tube geometry motor 92 with a greatly elongated tube assembly. One advantage of this invention is that it allows the designer to increase the magnetic flux density over the magnetic air gap without increasing the size of the motor structure in all radial directions. If more magnetic flux is needed, the designer can simply make the tube, magnets, and pole plate longer.

One significant advantage offered by this invention is that it enables the manufacturer to create two motors of different magnetic strengths, without significant investment in a second set of tooling. For example, a second, stronger motor can be manufactured simply by cutting a longer tube and by cutting a longer magnet or even using two copies of the same magnet placed end to end within the longer tube.

One advantage which this offers is that the speaker can be externally mounted into a cabinet (or car door, or wall, etc.) through a hole which is smaller than the largest dimension of the motor; one end of the motor can be poked through the hole, and slid inward until the other end of the motor passes through the hole. This is not possible with axisymmetric motors, just as a circular manhole cover does not fall into its manhole. In some applications, the designer may choose to elongate the motor in only a single direction, rather than uniformly as shown, putting the diaphragm assembly closer to one end of the motor than the other, which will allow an even larger motor structure to fit through a given hole size.

Having an asymmetric motor which is elongated in one direction may be especially advantageous in mounting a speaker into tight quarters. For example, the designer may need to place the speaker near an edge of an automobile door, perhaps with the outer diameter of the speaker frame in very close proximity to the edge of the door, or in close proximity to an internal keep-out zone within the door such as where clearance is needed for moving window mechanisms or the like. If the speaker were limited to a motor which did not extend beyond the perimeter of the basket, it may not be possible to achieve sufficient magnetic flux in the motor. However, by extending the tube motor in a single direction, opposite the door edge or keep-out zone, the magnetic flux of the motor can be raised to the required level, without having the motor's other end cause mounting problems.

In some embodiments, the length of the tube may be at least twice the width of the tube. In other embodiments, the length of the tube may be at least four times the width of the tube. In some embodiments, the length of the tube may be at least twice the width of the basket. In other embodiments, the length of the tube may be at least four times the width of the basket. In other embodiments, the length of the tube may be less than the width of the tube, or less than half the width of the tube.

Figure 5:
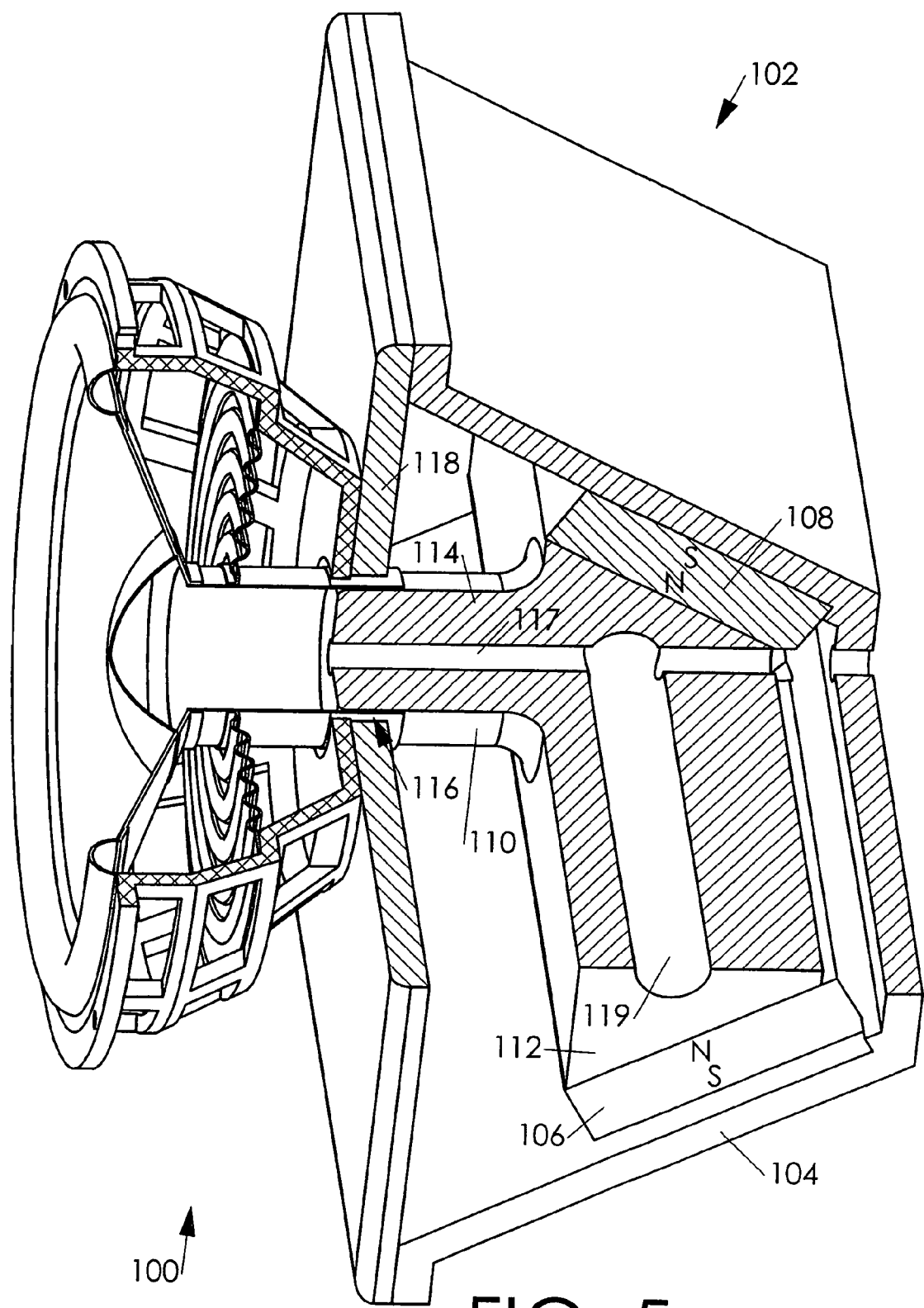
FIG. 5 shows a speaker having a v-shaped tube geometry motor according to another embodiment of this invention.

FIG. 5 illustrates another embodiment of a speaker 100 having a non-rectangular tube geometry motor 102. The motor includes a v-shaped tube 104. This tube, as with the other tubes taught in this document, may be of monolithic construction, or they may be formed by magnetically coupling separate components together, as shown here. One or more (and preferably two) hard magnets 106, 108 are magnetically coupled inside the v-shaped tube. A pole plate 110 is magnetically coupled to the hard magnets. Advantageously, the pole plate may include a wedge-shaped back plate 112 which has an exterior angle substantially the same as an interior angle of the v-shaped tube, so the back plate mates tightly with the hard magnets. The pole plate includes a pole piece 114 which defines a magnetic air gap 116 to the top plate 118 portion of the tube.

Figure 6:
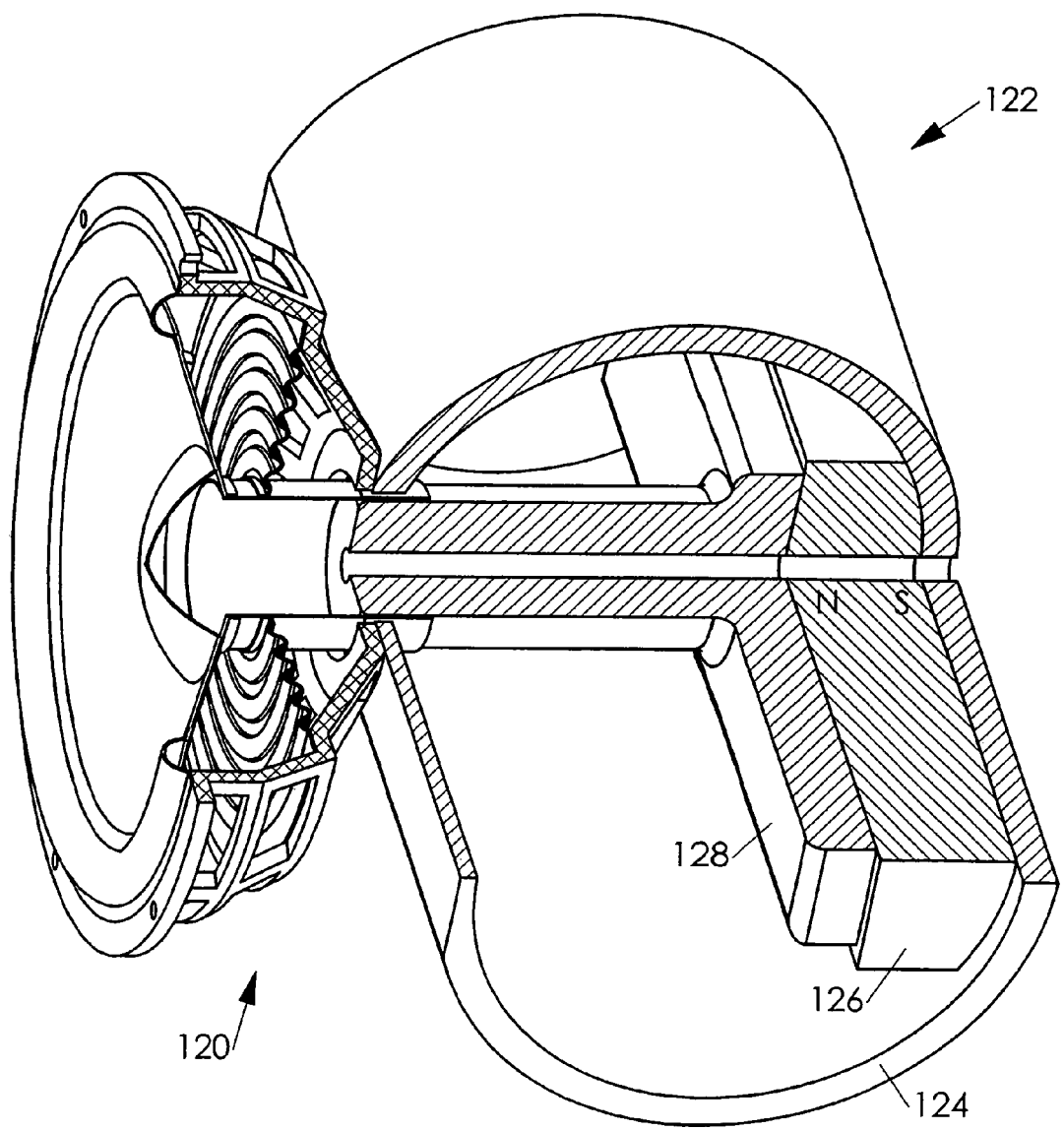
FIG. 6 shows a speaker having a cylindrical tube geometry motor according to another embodiment of this invention.

FIG. 6 illustrates another embodiment of a speaker 120 having a non-rectangular tube geometry motor 122. The motor includes a cylindrical tube 124, inside which is magnetically coupled a hard magnet 126. The mating surface of the hard magnet may advantageously be machined to the same shape as the interior surface of the tube; alternatively, a spacer of soft magnetic material and of suitable shape could be located between the tube and the magnet. A pole plate 128 is magnetically coupled to the hard magnet.

One advantage of the cylindrical tube shape is that the exterior surface of the tube is sloped away from the diaphragm assembly and is more aerodynamically shaped, which reduces the back-wave interference or back-pressure, and helps the diaphragm move more easily and reduces or scatters upper frequency reflections so they don't travel back up and through the cone. This feature may be added to the other tube configurations, such as by tapering the diaphragm side of the rectangular tube of FIG. 3.

Disadvantages of this specific configuration are that the magnetic air gap has a non-uniform height and position and that, consequently, it may be difficult to predict or to fine-tune the performance of the motor. Another disadvantage is that the curved internal shape of the back wall requires either a curved magnet or a curved spacer be fashioned. These disadvantages can be avoided by using a tube which has a flattened "racetrack" cross-sectional shape, with a flat back portion where the magnet attaches and a flat top portion where the magnetic air gap is formed and where the basket attaches.

Figure 7:
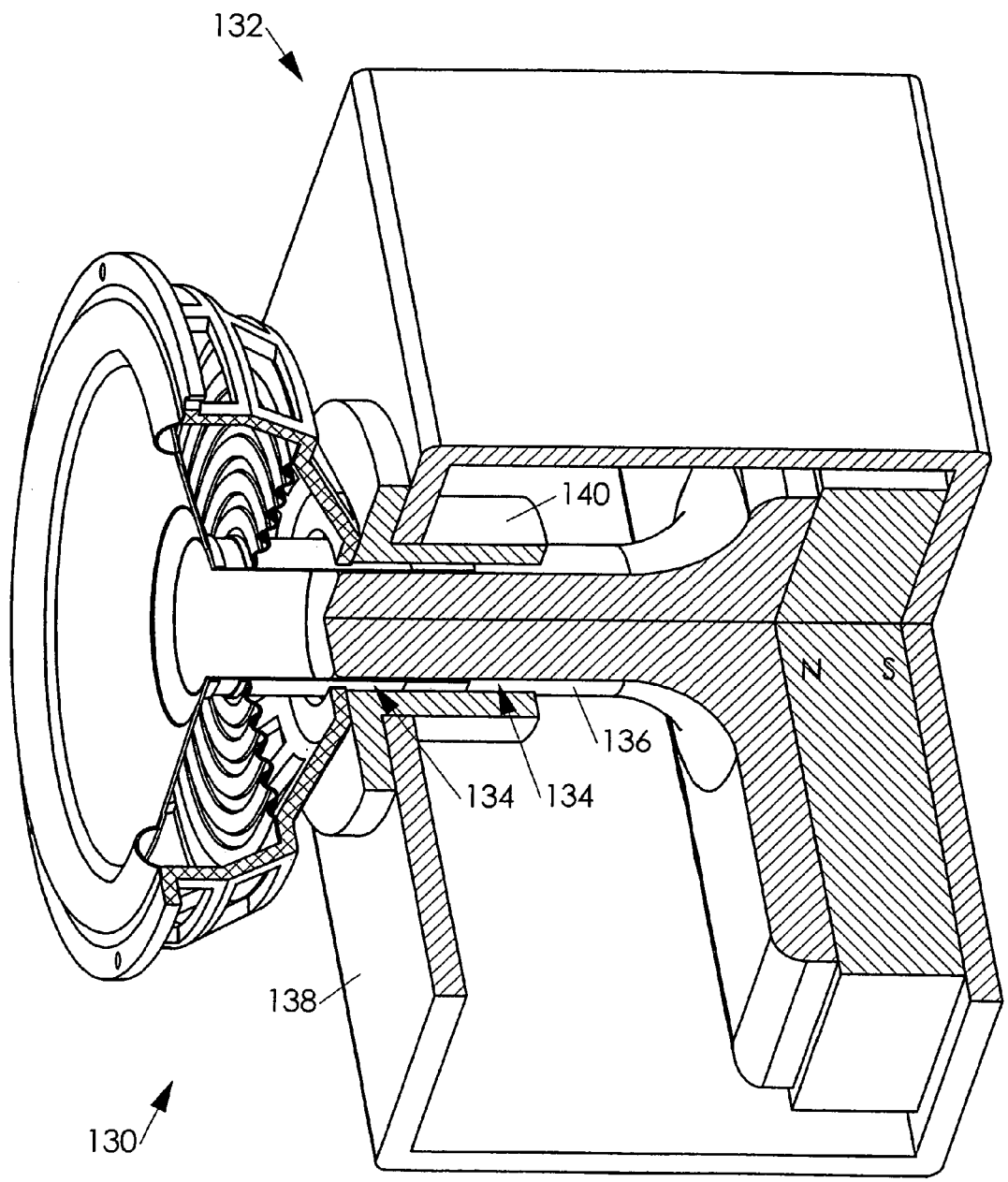
FIG. 7 shows a speaker having a tube geometry motor with a magnetic air gap sleeve according to another embodiment of this invention.

FIG. 7 illustrates another embodiment of a speaker 130 having a tube geometry motor 132. In this motor, the magnetic air gap 134 is not formed directly between the pole piece 136 and the tube 138. Rather, the hole through the tube is made larger, and a sleeve 140 of soft magnetic material is slipped into this larger hole, magnetically and mechanically coupled to the tube. The sleeve may offer a variety of advantages, such as allowing the use of an underhung voice coil which is longer than the thickness of the tube wall. The sleeve may also be useful with tubes which have a shape such that the thickness of the tube is not the same at all radial positions around the hole, such as in the case of a cylindrical tube, especially in the case, as in FIG. 6, where a flat has been machined onto the outer surface of the tube to facilitate better coupling of the diaphragm assembly to the tube. The sleeve can be of any desirable shape, and is not necessarily the generally cylindrical shape shown.

Figure 8:
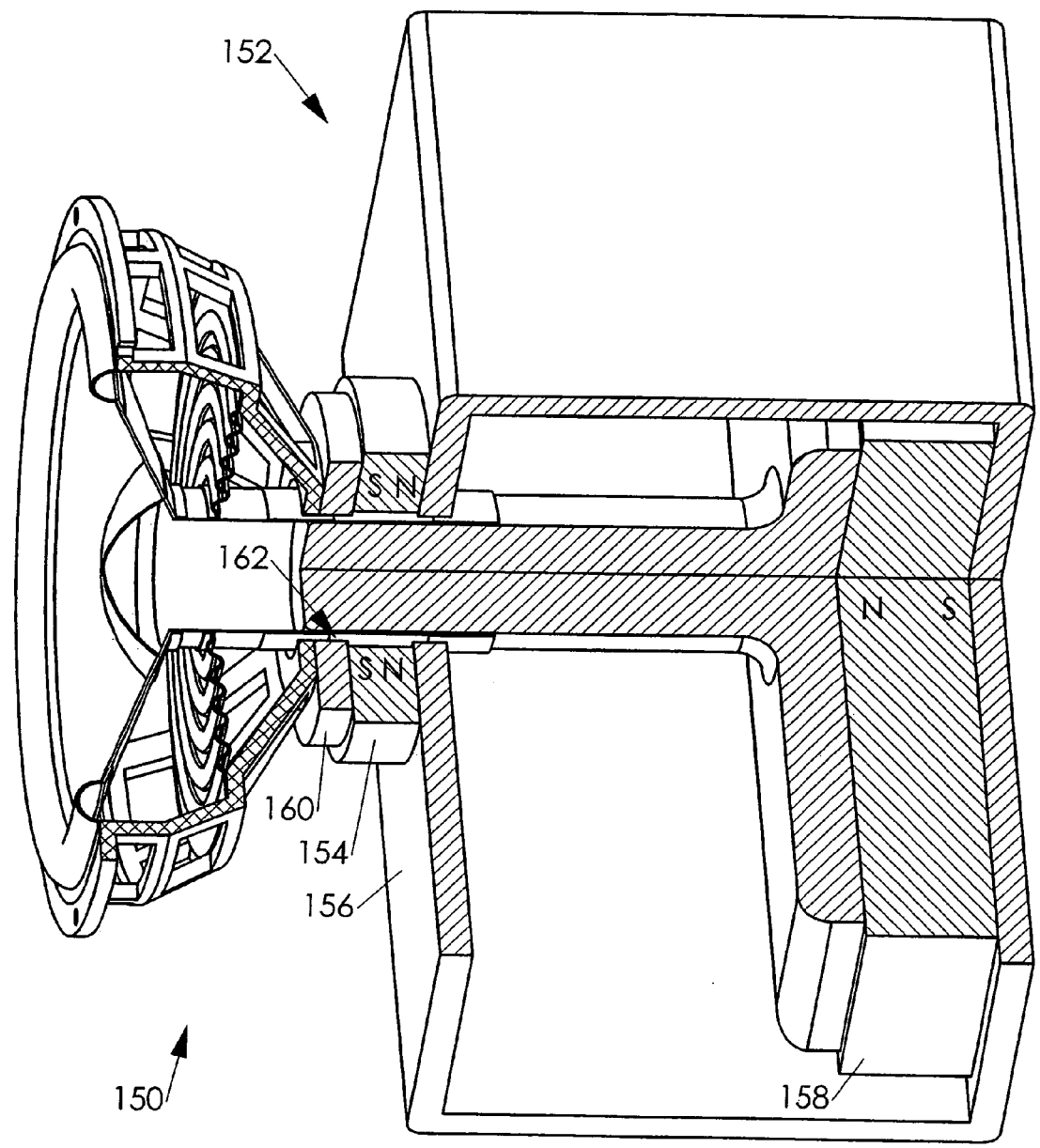
FIG. 8 shows a speaker having a tube geometry motor with an external second magnetic air gap according to another embodiment of this invention.

FIG. 8 illustrates another embodiment of a speaker 150 having a tube geometry motor 152 which combines this invention with the "Push-Push Multiple Magnetic Air Gap Transducer" invention. An external hard magnet 154 is magnetically coupled to the exterior surface of the tube 156, around the hole. The external hard magnet may have any desired shape, and is not necessarily confined to being an elongated bar such as the shape of the main magnet 158 inside the tube. An external top plate 160 is magnetically coupled to the external hard magnet, and defines a second magnetic air gap 162 to the pole piece 164. If the internal and external hard magnets have their magnetic poles in opposite orientation, the magnetic flux flows in the same direction over both magnetic air gaps, as shown, and the motor is a "push-push" motor. By correctly sizing the external magnet relative to the other aspects of the geometry, the magnetic flux over the two gaps may be balanced. The voice coil assembly may include two voice coils, as shown, or it may include only a single voice coil. The voice coils may be overhung, underhung, equal-hung, or semi-hung as shown.

If the internal and external hard magnets are magnetized in the same orientation, the magnetic flux over the two magnetic air gaps will flow in opposite directions, and the motor will be a "push-pull" motor, in which the voice coils are wound in opposite directions or driven with opposite phase signals.

Figure 9:
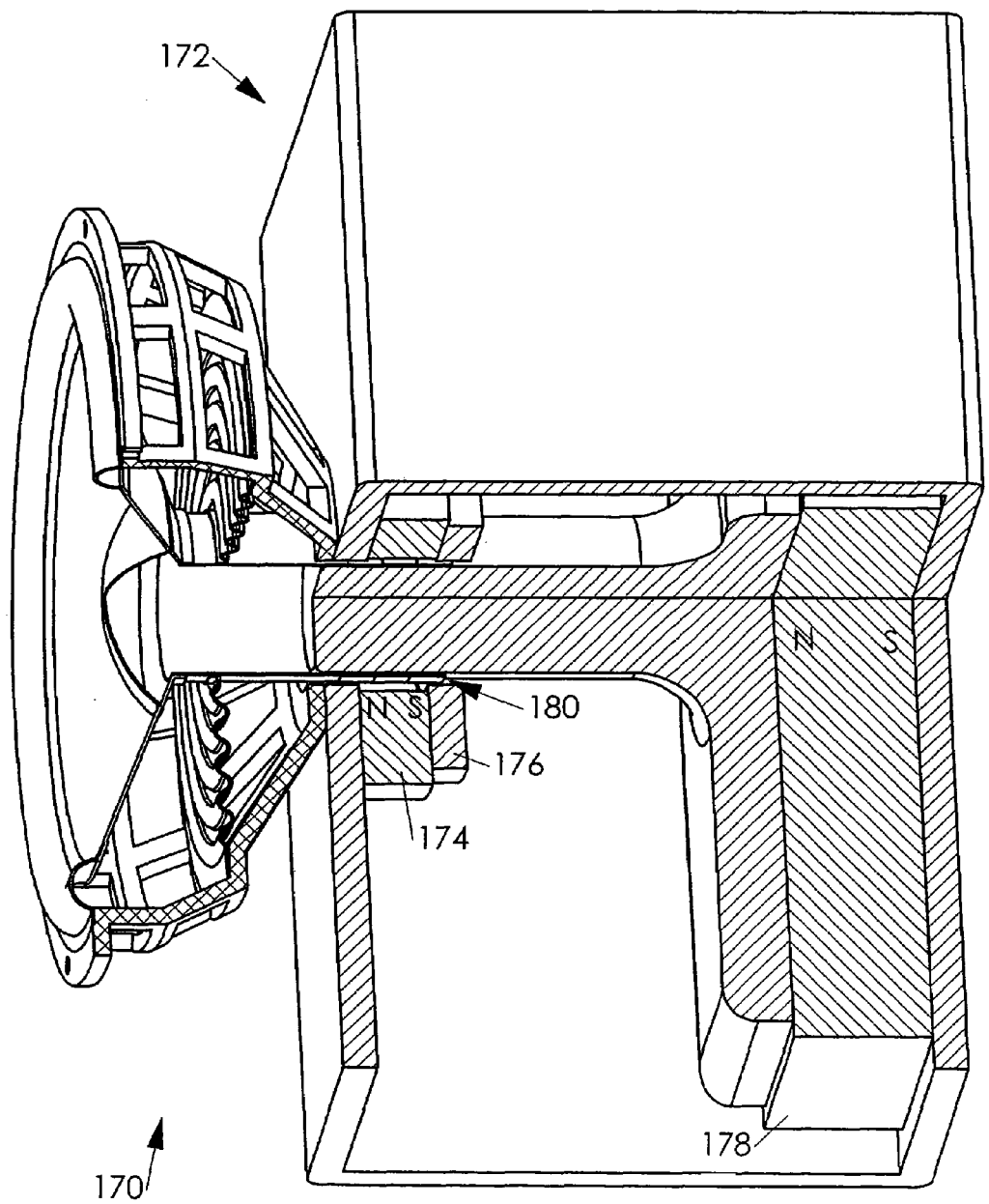
FIG. 9 shows a speaker having a tube geometry motor with an internal second magnetic air gap according to another embodiment of this invention.

FIG. 9 illustrates another embodiment of a speaker 170 having a tube geometry motor 172 which uses an internal secondary hard or soft magnet 174 and internal top plate 176.

One advantage of this configuration over that of FIG. 8 is that the primary hard magnet 178 and the secondary hard magnet may be charged simultaneously and after assembly of the motor, with the motor having a push-push geometry.

Figure 10:
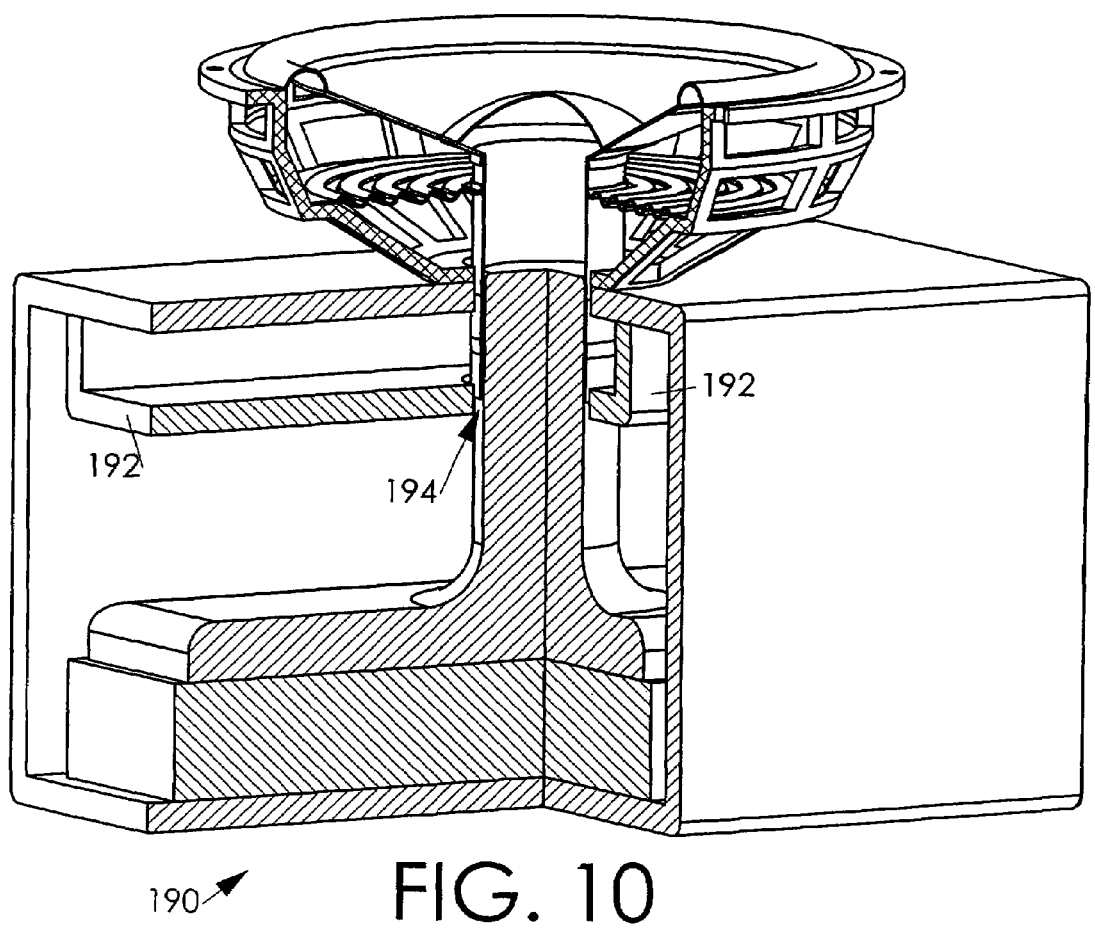
FIG. 10 shows a speaker having a tube geometry motor with a channel component providing a second magnetic air gap.

FIG. 10 illustrates another push-push dual-gap geometry tube motor speaker 190. A channel component 192 of soft magnetic material is magnetically coupled inside the motor's tube, and provides a second magnetic air gap 194, without requiring any additional hard or soft magnet. If necessary, magnetic flux over the two respective magnetic air gaps can be balanced by, for example, making the channel component shorter than the tube to decrease magnetic flux over the second magnetic air gap. In one embodiment, the channel component has a rectangular U shape. In other embodiments, it could have other shapes, such as semi-cylindrical, semi-hexagonal, or the like.

Figure 11:
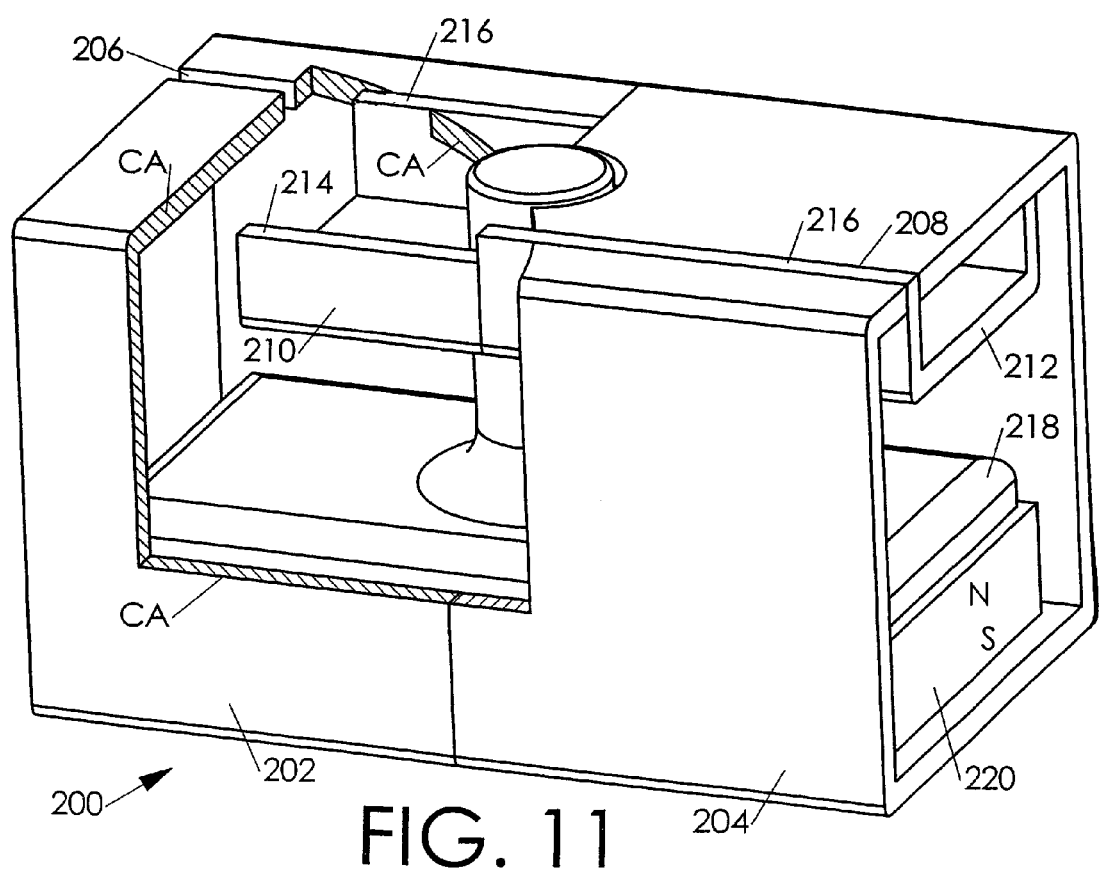
FIG. 11 shows a tube geometry motor structure in which the tube includes two components butted end-to-end and coupled together by mating channel components inside the tube.

FIG. 11 illustrates another push-push dual-gap geometry tube motor 200. The motor includes a pair of tubes 202, 204 coupled end-to-end into a single tube structure. For ease of illustration, the tube structure is illustrated with a cutaway CA, to provide visibility of internal components. In some embodiments, the tubes are of identical construction, with one of them being reversed 180° as illustrated. Each tube includes a slot or groove 206 (or 208) which extends into the soft magnetic material of the tube from the inside, and may, as illustrated, extend all the way through the tube wall.

A channel component 210 is disposed within the tube structure and may, in some embodiments, serve to mechanically couple the two tubes together. The channel component has a lower wall 212 which defines the second magnetic air gap (not visible). The channel component has a first side wall 214 which butts against the inner wall of the tube structure, and a second side wall 216 which is taller to extend into the slot of the tube structure. In some embodiments, the channel component may be formed as a monolithic structure. In other embodiments, it may be formed in a manner similar to the tube structure, by butting two identical components end-to-end with one of them reversed, as illustrated. The channel component may extend to the end of the tube structure, as illustrated on the right half of the figure, or it may terminate at some point inside the tube structure, as illustrated on the left half of the figure.

This split tube structure enables assembly of motor structures which would not otherwise be possible, such as with a monolithic pole plate 218 having a vertical dimension larger than the internal vertical dimension of the tube (for ease of illustration, the pole piece is not illustrated as being that long). In such cases, the channel component is placed down over the pole piece, the two tube halves are slid from their respective ends over the pole plate and the channel component until they abut one another, and the channel component is raised upward until its taller side walls engage the longitudinal slots of the tubes. The side walls could then be welded or otherwise affixed to their mated tubes. In some embodiments, the slots and the taller portions of the side walls might be tabbed or keyed to prevent longitudinal movement of the tubes once the channel component is engaged. In other embodiments, the tubes could be welded or otherwise coupled together to prevent longitudinal separation. Depending upon the particular needs of the application, the magnet 220 can be positioned either before or after other assembly steps. Other tube geometry motors can be similarly split for assembly, without the need for the channel component.

Figure 12:
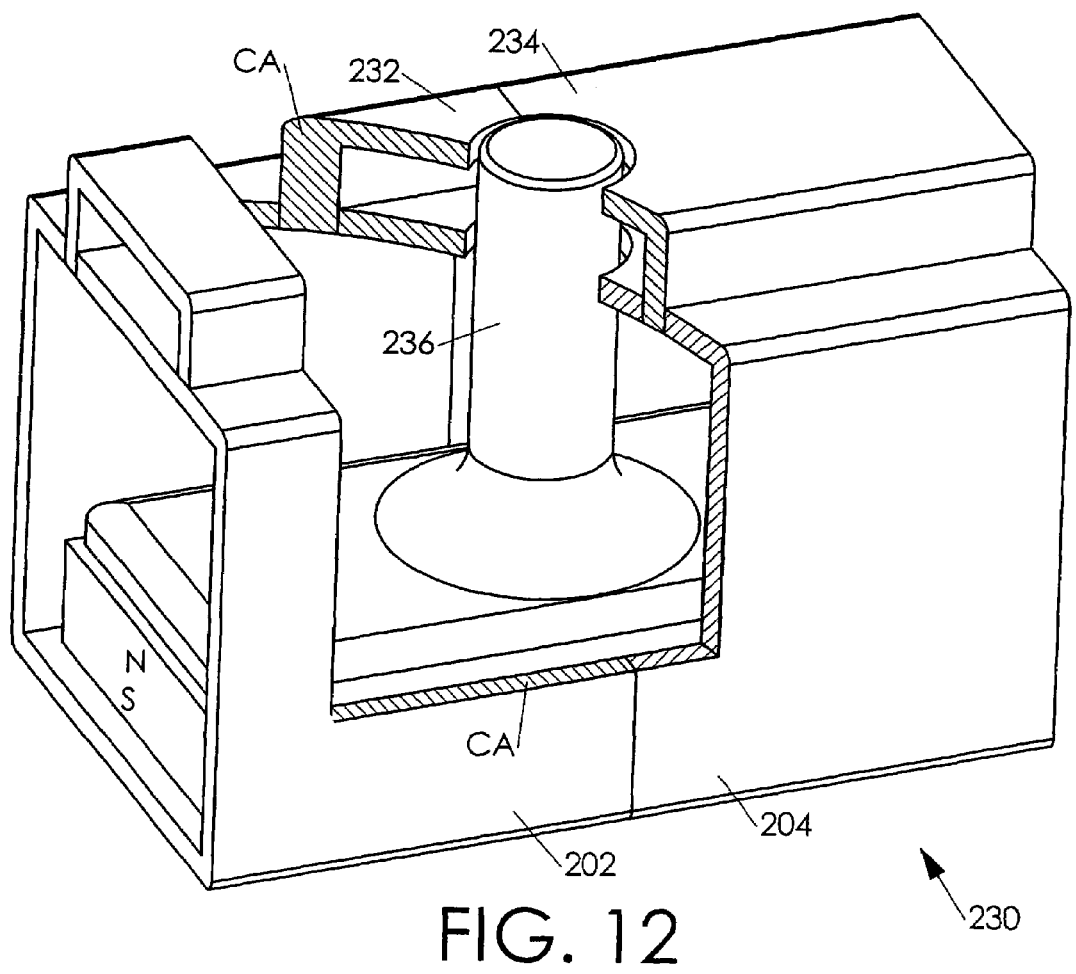
FIG. 12 shows a tube geometry motor structure in which the mating channel components are external to the tube.

FIG. 12 illustrates another embodiment of a tube motor 230 in which the channel component 232, 234 is coupled outside the tube 202, 204. The pole piece 236 extends through the tube's hole and through the channel component's hole, to define the two magnetic air gaps. The tube motor is illustrated with a cutaway, for better visibility into its internal structures.

Figure 13:
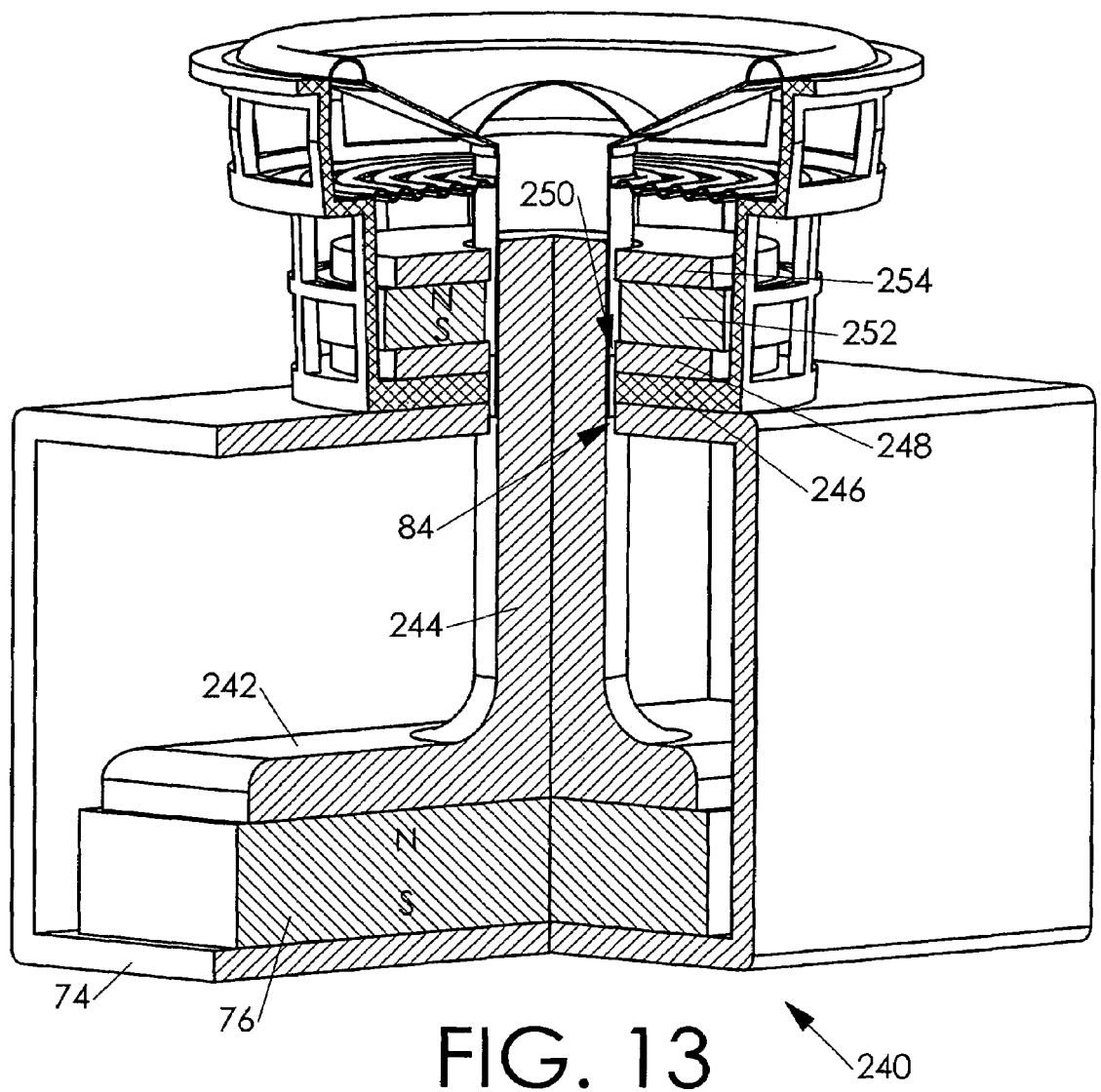
FIG. 13 shows a speaker having a hybrid tube geometry motor structure.

FIG. 13 illustrates yet another embodiment of a speaker 240 which advantageously utilizes principles from the present invention in conjunction with principles taught in the above-referenced co-pending applications by this inventor. The speaker includes a hybrid internal/external magnet tube geometry motor structure with a push-push dual magnetic air gap and a low reluctance return path.

The motor includes a tube 74 inside of which is magnetically coupled an internal hard magnet 76 having its magnetic polarity in a first orientation, such as with the south pole face coupled to the interior of the tube. The motor includes a pole plate 242 having an elongated pole piece 244 which extends significantly out of the air gap hole through the tube which defines a lower magnetic air gap 84. A non magnetically conductive spacer 246 is provided between the tube and a top drive plate 248. The top drive plate defines an upper magnetic air gap 250 to the pole piece. In some embodiments, such as that shown, the spacer may simply be the lower portion of the speaker basket.

An external hard magnet 252 is magnetically coupled between the top drive plate and a low reluctance return path plate 254. The external hard magnet has its magnetic polarity in the same orientation as the internal hard magnet, such as with the south pole facing the tube as shown. The magnetic flux flows in the same direction (e.g. outward) over both magnetic air gaps 84, 250. The low reluctance return path plate defines a low reluctance magnetic air gap to the pole piece. This path is not used for driving the voice coil assembly. The magnetic flux flows over the low reluctance magnetic air gap in the opposite direction as the flux over the two drive magnetic air gaps. The voice coil or voice coils may advantageously be wound about the bobbin in a same direction and positioned to extend from the middle of the lower magnetic air gap to the middle of the upper magnetic air gap. This dual gap geometry gives a tremendous increase in linear excursion of the voice coil assembly, resulting in an increased sound pressure level or perceived loudness from the diaphragm. In some embodiments, it may be desirable to balance the flux over the two drive magnetic air gaps to minimize distortion, while in others this may not be as necessary.

Figure 14:
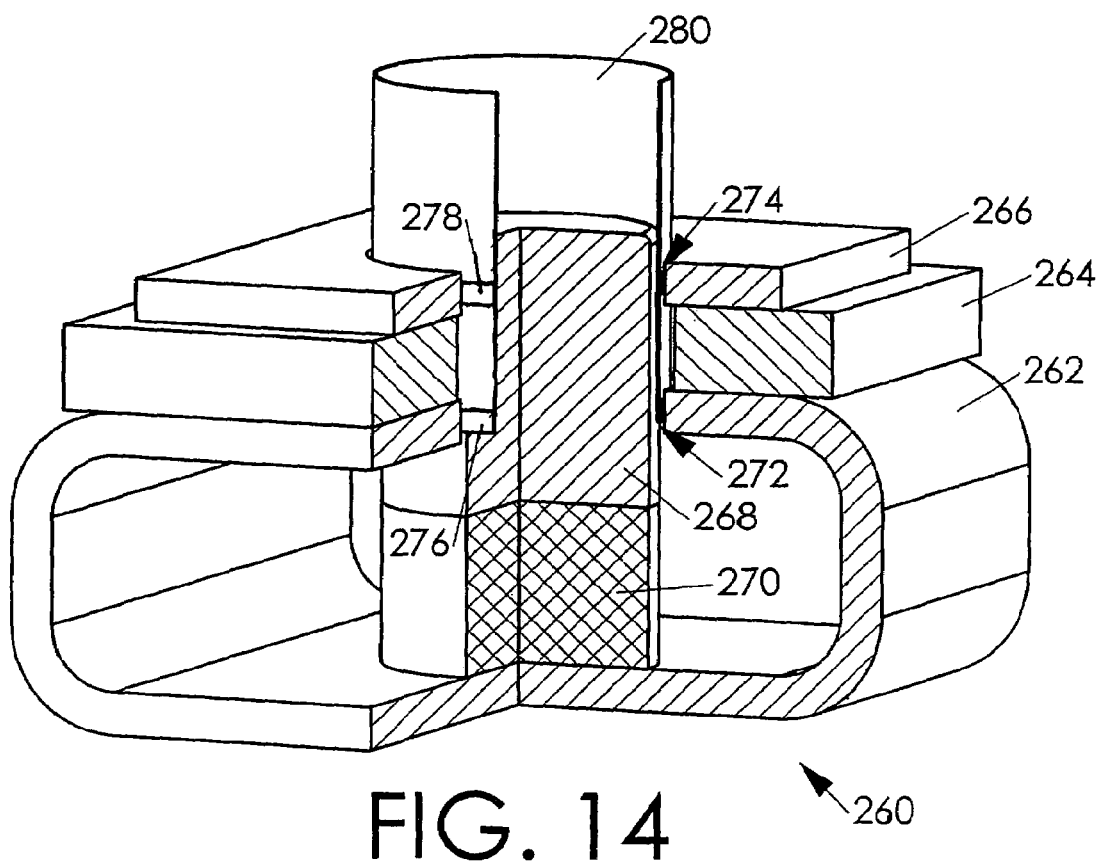
FIG. 14 shows one embodiment of a push-pull tube motor structure.
Figure 15:
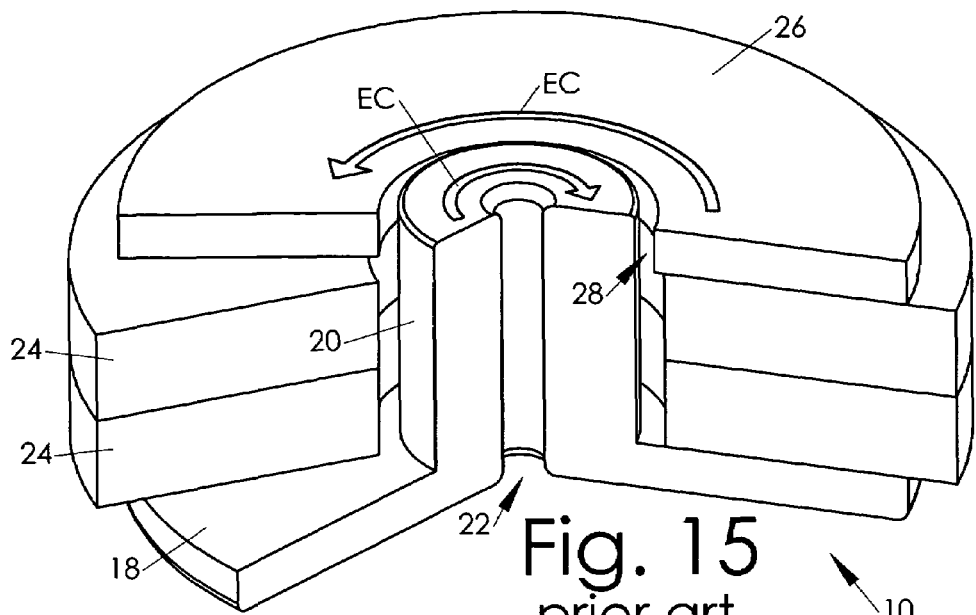
FIG. 15 shows a partial cutaway perspective view of a conventional external magnet geometry motor structure, illustrating eddy currents which are induced in the pole piece and top plate upon operation of the speaker.

FIG. 14 illustrates a push-pull implementation of a tube geometry motor 260. The motor includes a tube 262 including an air gap hole. A hard magnet 264 is magnetically coupled between the exterior surface of the tube and a top plate 266. A pole piece 268 is disposed within the holes through the tube, magnet, and top plate, and is coupled to the tube by a non magnetically conductive spacer 270. The tube and pole piece define a lower magnetic air gap 272, and the top plate and pole piece define an upper magnetic air gap 274. A lower voice coil 276 is disposed within the lower magnetic air gap, and an upper voice coil is disposed within the upper magnetic air gap. In one magnetic pole orientation, magnetic flux from the magnet enters the top plate, crosses the upper magnetic air gap, travels down through the pole piece, crosses the lower magnetic air gap in the opposite direction, enters the tube, and returns to the magnet. The voice coils are wound in opposite directions around a bobbin 280, or are driven out of phase.

Unlike other embodiments shown, the side walls and bottom of the tube are not a significant part of the magnetic circuit in this push-pull configuration, as only the soft magnetic material of the top of the tube adjacent the magnet will play a significant part in the magnetic circuit here, as the non magnetically conductive spacer takes the side walls and bottom of the tube out of the circuit. The depth (top to bottom) of the tube serves to provide bottoming clearance for the voice coil assembly. The bottom of the tube serves as a coupling point for the spacer, which provides a coupling point for the pole piece. The bottom and side portions of the tube do not necessarily have to extend as long as the top portion and the magnet.

In a different embodiment, the magnet could be moved inside the upper wall of the tube, and the top plate could be coupled to the bottom side of the magnet, such that the push-pull magnetic circuit is inside the tube with the tube's air gap hole forming the upper magnetic air gap.

In FIGS. 16-21, cross-hatching has been omitted from cross-sectioned faces, to avoid confusion between cross-hatching and laminated structures.

Figure 16:
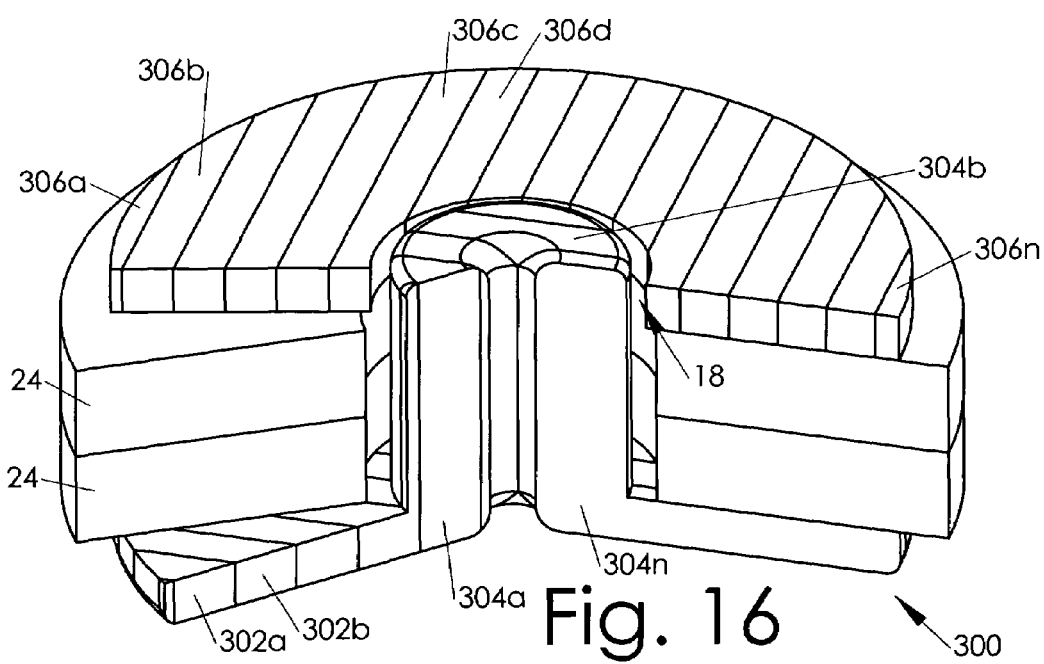
FIG. 16 shows a partial cutaway perspective view of an external magnet geometry motor structure having a soft magnetic top plate (and pole plate) constructed as a laminate of multiple flat segments of a uniform thickness.

FIG. 16 illustrates an external magnet geometry motor structure 300 according to the present invention. The motor structure may use the same magnet 24 as in the prior art.

One or more of the other motor structure components may be laminated, most suitably those which are electrically conductive and in which eddy currents would otherwise be induced during operation of the motor structure. The skilled engineer will, given the teachings of this disclosure, be able to determine which components to laminate, how thin to make each laminated layer, what shape to make the laminated layer segments, and so forth, given the requirements of the application at hand. The electrical insulating material is not specifically shown in this disclosure, owing to its typically very thin dimensions. However, it does have a non-zero thickness, and displaces soft magnetic material; the thinner the laminated segments, the greater percentage of the overall structure will be comprised of insulating material. Thus, the engineer will make a suitable tradeoff between the degree of eddy current reduction, and the degree of decreased power or efficiency of the magnetic circuit.

The electrical insulating material should be able to resist the operating temperature of the motor structure. However, this operating temperature will be reduced, owing to the reduction of eddy current heating. Also, unlike failures in the voice coil insulating material, a relatively small number of failures in the laminate structure insulating material will not have a significant audible effect on the performance of the speaker; the speaker may run a tiny bit hotter, if the insulation between two adjacent laminate layer segments fails and the two segments are electrically rejoined, and eddy currents are slightly increased in this double-thickness segment; however, in a suitably laminated structure, this will not have any meaningful impact on the overall reduction of eddy currents in the structure as a whole.

The top plate 306 may be fabricated as a laminate of multiple sections 306a-n. The pole plate may be constructed as a laminate of multiple sections 302a-n, 304a-n. In some embodiments, such as that shown (by section 304n), the pole piece may be integrally formed with the back plate. In other embodiments, the pole piece and the back plate may be fabricated separately, and then coupled together. In some such embodiments, the pole piece is laminated and the back plate is a monolithic component. In others, the pole piece is monolithic, and the back plate is laminated. In others, both are laminated. If one is laminated and the other is not, they should be magnetically coupled but electrically insulated, so the monolithic one does not electrically short the laminated segments of the other. In general, it will be found most beneficial to laminate structures which are closest to the voice coil (not shown), as it is the voice coil's magnetic field which induces eddy currents in the neighboring structures. Although, for example, the top plate is shown as being laminated in only a single direction, this is not a necessary limitation; the top plate could, instead, be made as a "laminate of laminates", for example by stacking two of the illustrated top plates vertically, with electrical insulating material between them.

If the permanent magnet is electrically conductive, it, too, can be laminated.

The orientation of the divisions between the laminated segments should be (to the extent practical) perpendicular to the direction of eddy current flow, such that the electrical insulating material interrupts the path which the eddy current would have taken. If two or more components are laminated, their lamination does not necessarily have to be in the same direction nor in the same orientation.

In FIG. 16, the laminate layers may be formed from flat plate or sheet material of a substantially constant thickness.

Figure 17:
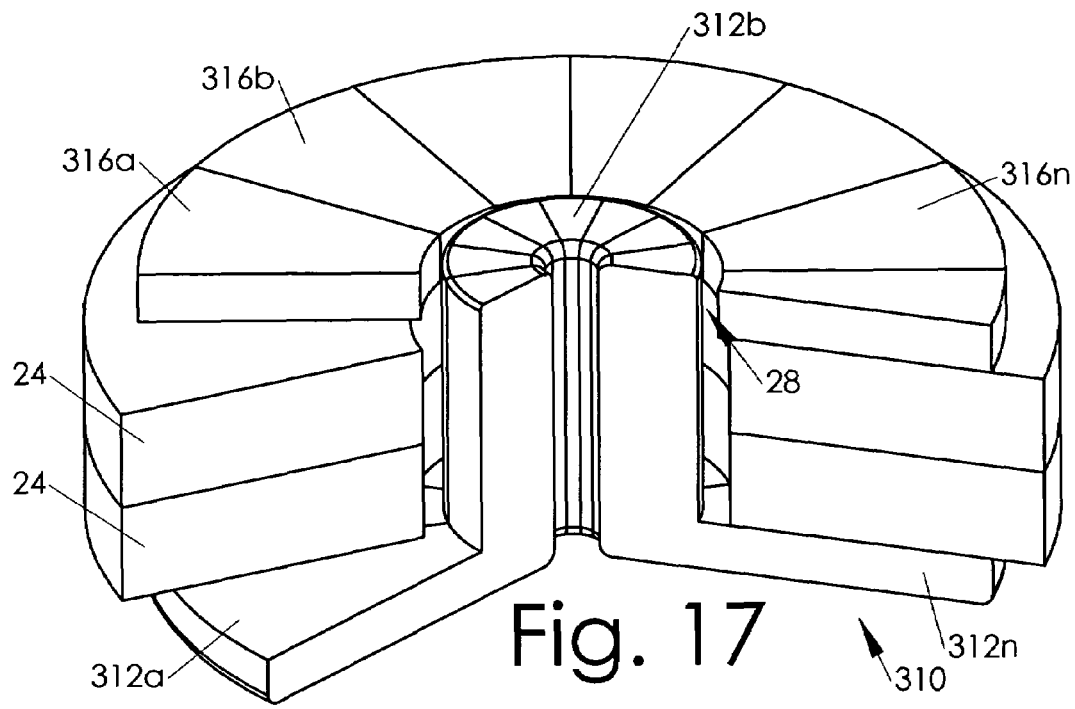
FIG. 17 shows a partial cutaway perspective view of an external magnet geometry motor structure having a soft magnetic top plate (and pole plate) constructed as a laminate of multiple wedge shaped segments.

FIG. 17 illustrates an external magnet geometry speaker 310 in which the laminated components are formed from sections having more complex shapes such as wedges, rather than being cut from sheet stock. The pole plate 312 is formed from multiple wedge-shaped sections 312a-n, and the top plate 316 is formed from multiple wedge-shaped sections 316a-n.

Figure 18:
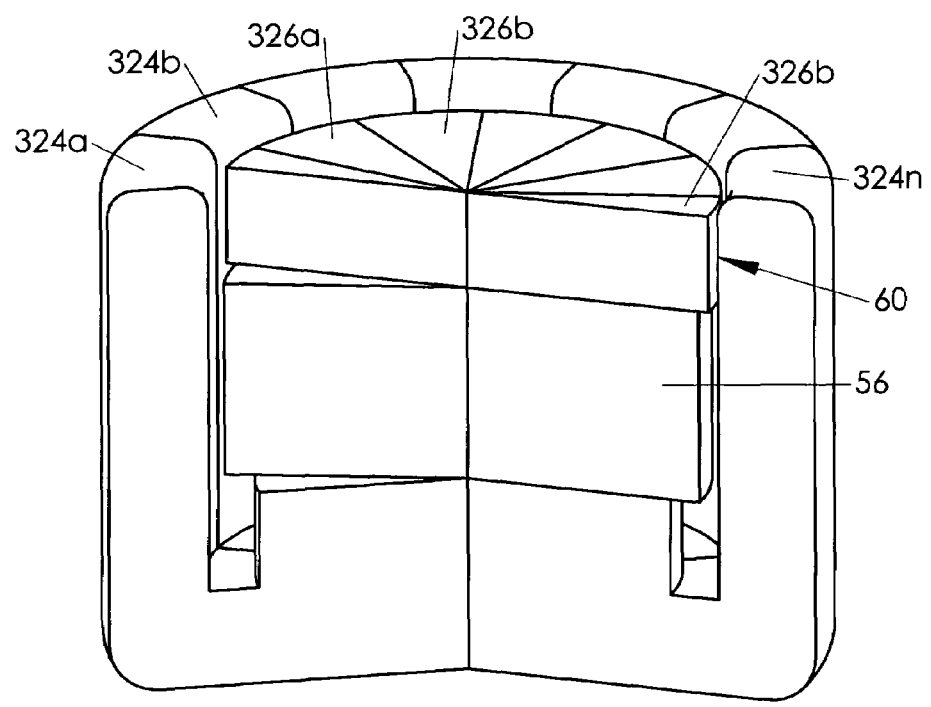
FIG. 18 shows a partial cutaway perspective view of an internal magnet geometry motor structure having a soft magnetic top plate (and cup) constructed as a laminate of multiple wedge shaped segments.

FIG. 18 illustrates an internal magnet geometry motor structure 320 in which the laminated components are formed from similarly wedge-shaped sections. The cup 324 is made of multiple wedge-shaped sections 324a-n. A magnet 56 is disposed within the cup and is magnetically coupled to the bottom portion of the cup. A top plate 326 is magnetically coupled to the magnet, and is comprised of multiple wedge-shaped sections 326a-n. The magnetic air gap 60 is defined between an inner diameter of the side wall of the cup and the outer diameter of the top plate. The cylindrical portion of the cup could be formed separately from the bottom portion, and either can be laminated independent of the other.

Figure 19:
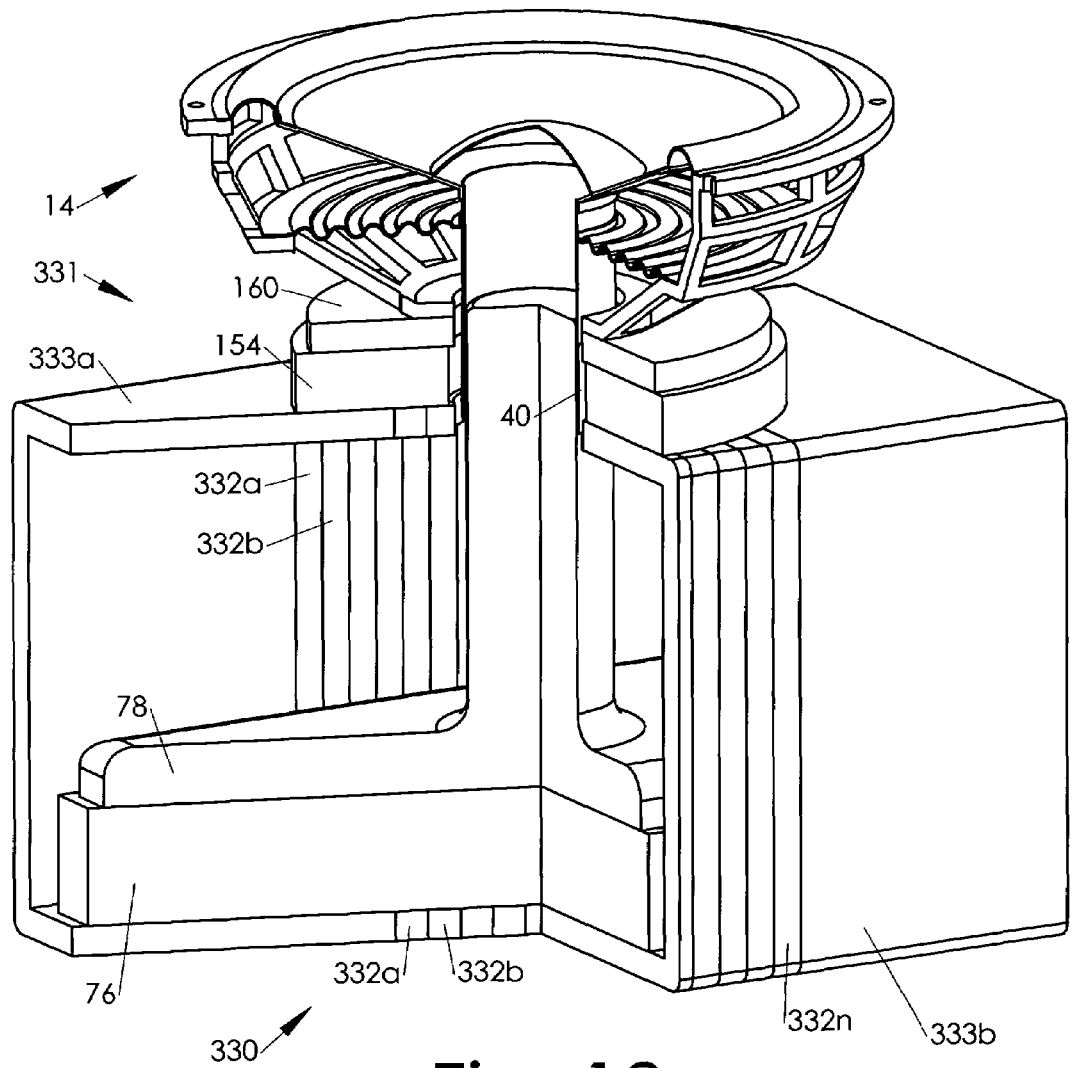
FIG. 19 shows a partial cutaway perspective view of a speaker having a tube geometry motor structure having a soft magnetic tube constructed as a laminate of multiple flat segments, and also shows that it is not necessary to laminate the entire structure in all embodiments.

FIG. 19 illustrates a tube geometry speaker 330 (generally similar to that of FIG. 8, with the addition of lamination) including a basket and diaphragm assembly 14 and a motor structure 331. The motor structure includes a tube 332, 333 which is constructed as a laminate of multiple tube sections 332a-n, 333a-b. A magnet 76 is magnetically coupled to the inside of the laminated tube. An internal pole plate 78 is coupled to the magnet, and could be laminated, but is not shown as such in FIG. 19. The speaker further includes an external magnet 154 which is magnetically coupled to the outside of the tube, and an external top plate 160 which is magnetically coupled to the external magnet.

FIG. 19 further illustrates that it is not necessary in all instances to laminate a component in its entirety. For example, the tube includes laminated segments 332a-n and non-laminated segments 333a and 333b. As shown, it is most beneficial to laminate the portions of the structure which are closest to the voice coil 40.

The external top plate could also be laminated, of course.

Figure 20:
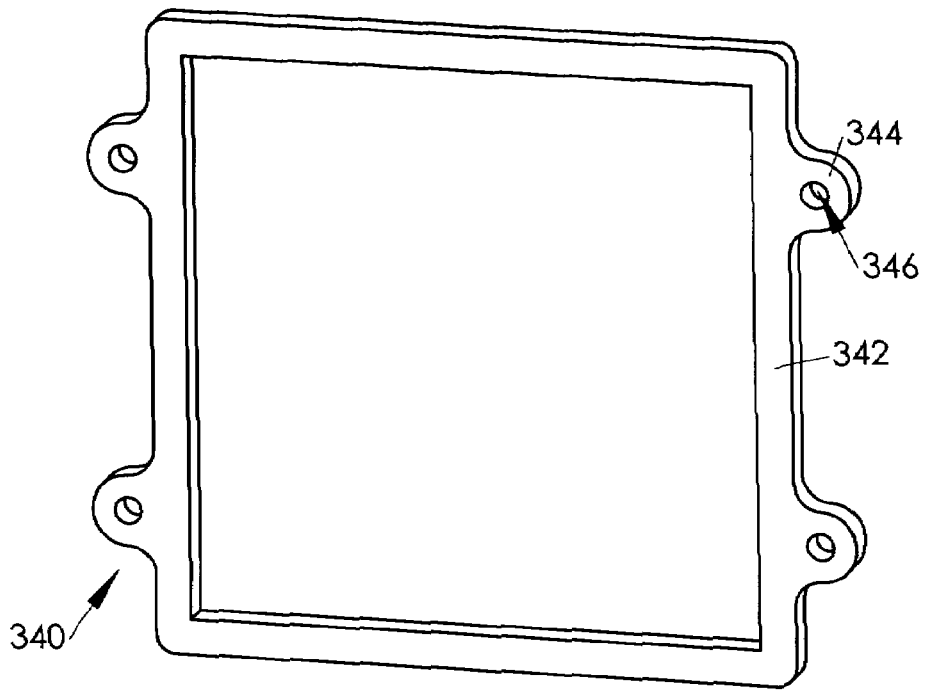
FIG. 20 shows one embodiment of a flat segment which can be employed in creating a laminated tube motor.

FIG. 20 illustrates one embodiment of a laminate tube layer section 340 (such as may be used in constructing the square tube speaker of FIG. 19). The layer section includes a magnetically conductive body 342. In some embodiments, it may be adequate to use an adhesive such as epoxy to bond the plurality of layer sections together. However, in other embodiments, it may be desirable to provide some mechanical coupling to increase the strength and improve the alignment consistency of the structure. The layer section body may include one or more mechanical coupling means, such as tabs 344 with holes 346. Bolts (not shown) may be passed through corresponding holes 346 of each of the layer sections, and then be tightened down to stiffen the tube and lock its sections into place. This may be done in conjunction with, or in lieu of, an adhesive such as epoxy or the like. In some embodiments, the bolts can be equipped with nuts, while in other embodiments, the final layer section may include threaded holes to which the bolts are secured.

Figure 21:
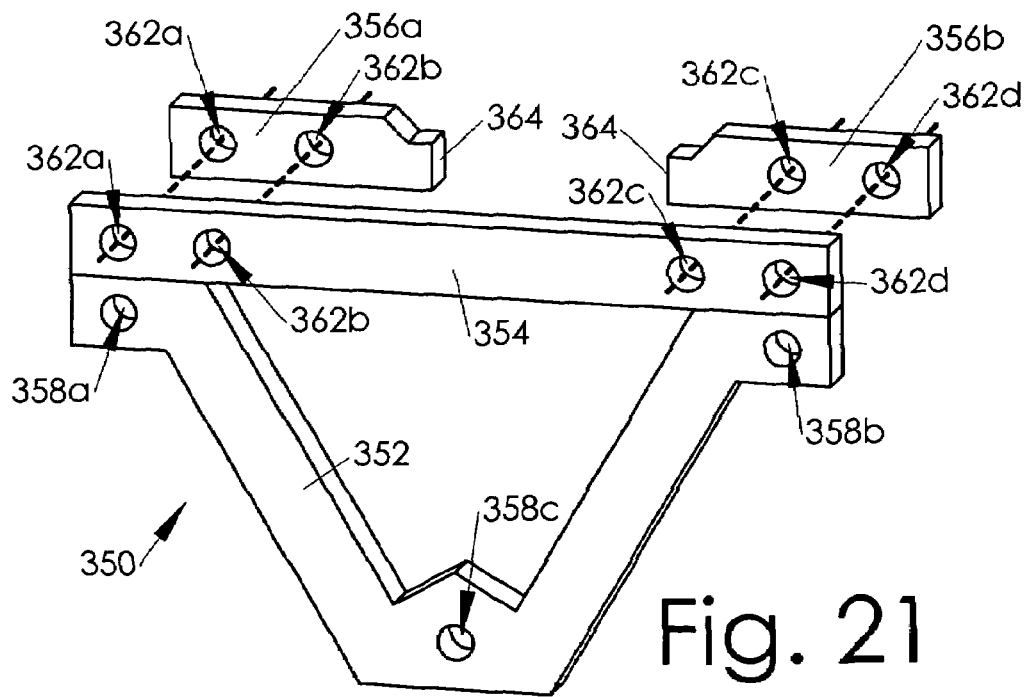
FIG. 21 shows an embodiment of a v-shaped segment, a top plate segment, and a split top plate segment, which can be employed in creating a laminated v-tube motor.

FIG. 21 illustrates another embodiment of a composite laminate tube layer section 350 (such as may be used in the V-shaped tube embodiment of FIG. 5). The layer section is a composite in that it includes a V-shaped section 352 and a top plate section 354 or 356 (depending upon whether the particular section is involved in defining the magnetic air gap). The V-shaped section includes one or more holes 358 through which a bolt or the like may be coupled. The single-piece top plate section 354 and the two-piece top plate section 356a, 356b may advantageously include holes 362a-d in corresponding locations, so the entire set of top plate sections can be bolted up into a single assembly. The two-piece top plate section includes a pair of opposing faces 364 which form the perimeter of the hole which, together with the pole piece (not shown), defines the magnetic air gap. In some embodiments, in order to improve magnetic conductivity through the various sections, the portions of those sections surrounding the various holes may be bulged or enlarged.

In some embodiments, the top plate may be formed by coupling together only the one-piece type of sections 354 and then cutting the magnetic air gap defining hole where required. In embodiments which utilize two-piece sections 356, it may typically be the case that not all of the two-piece sections are of identical shape and size, and even that not all of the one-piece sections are of identical shape and size; advantageously, the sections which make up the hole for the magnetic air gap may be pre-formed such that, when coupled together in the correct order, they create a circular hole. In other embodiments, a rectangular hole may be formed (by using identically shaped and sized two-piece sections) for use with a rectangular pole piece and rectangular voice coil assembly. Or, it could use a non-electrically conductive, magnetically conductive adapter plug which is rectangular on the outside and circular on the inside, thereby defining an annular gap.

CONCLUSION

The skilled designer will, when armed with the teachings of this disclosure, be able to select which components are to be laminated, and how many layers should be in each laminated component. The requirements of the application at hand may dictate tradeoffs to be made between the number of layers, the cost of manufacturing, the required magnetic conductivity, and so forth. Any suitable electrical insulation material can be used to separate the layers or sections in a laminated structure. When selecting insulation materials, the designer should take into consideration the vigorous mechanical action of the speaker, thermal performance requirements, and so forth. In some embodiments, the insulating material may be, for example, a varnish in which the layer sections are dipped. In other embodiments, the insulating material may itself comprise separate, distinct layers of material sandwiched between the magnetically conductive laminate layers of the pole piece or other laminated structure.

The sizes of the various magnets, plates, diaphragms, voice coils, and other components are shown in the FIGS. for ease of illustration only. In practice, the skilled designer will select components of various geometries according to the needs of the application at hand. The skilled reader will further appreciate that the drawings are for illustrative purposes only, and are not scale models of optimized transducers.

"Ring-shaped" or "annular" should not necessarily be interpreted to mean "cylindrical", but can include other shapes, such as squares, which have holes through them and are thus substantially donut-shaped. "Disc-shaped" should not necessarily be interpreted to mean "cylindrical", but can include other shapes, such as squares, which do not have meaningful holes through them. The skilled reader will readily appreciate that the various magnets illustrated in the drawings are shown with a particular N-S polarity orientation, and that the magnets can equally well be positioned with the opposite orientation. The skilled reader will also appreciate that, for example, an "elongated magnet" can be formed either as a monolithic magnet having an elongated shape, or by placing multiple magnets end to end.

Materials may be classified as either magnetic materials or non-magnetic materials. Non-magnetic materials may also be termed non magnetically conductive materials; aluminum and chalk are examples of non-magnetic materials. Magnetic materials are classified as hard magnetic materials and soft magnetic materials. Hard magnetic materials are also called permanent magnets, and generate magnetic flux fields without outside causation. Soft magnetic materials are those which, although not permanent magnets, will themselves become magnetized in response to their being placed in a magnetic field. Soft magnetic materials include the ferrous metals such as steel and iron.

The phrase "magnetically coupled to" is intended to mean "in magnetic communication with" or in other words "in a magnetic flux circuit with", and not "mechanically affixed to by means of magnetic attraction." The phrase "magnetic air gap" is intended to mean "gap over which magnetic flux is concentrated" and not limited to the case where such gap is actually filled with air; the gap could, in some applications, be filled with any suitable gas or liquid, or even be under vacuum. The skilled reader will appreciate that magnetic flux may be interpreted as flowing either from the north to the south, or from the south to the north.

When one component is said to be "adjacent" another component, it should not be interpreted to mean that there is absolutely nothing between the two components, only that they are in the order indicated.

The various features illustrated in the figures may be combined in many ways, and should not be interpreted as though limited to the specific embodiments in which they were explained and shown.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. An audio speaker comprising:
a motor assembly having an axis and including,
a magnet,
a first magnetically conductive member magnetically coupled to the magnet, the first magnetically conductive member comprising a plurality of laminated layer sections which are magnetically coupled to but electrically insulated from each other, wherein the laminated layer sections are separated along boundaries which are substantially parallel to the axis, and
a second magnetically conductive member magnetically coupled to the magnet,
a magnetic air gap between the first and second magnetically conductive members; and
a diaphragm assembly coupled to the motor assembly and including a voice coil disposed within the magnetic air gap.

2. The audio speaker of claim 1 wherein:
each of the laminated layer sections has a substantially uniform thickness.

3. The audio speaker of claim 1 wherein:
the laminated layer sections are not all of the same thickness.

4. The audio speaker of claim 1 wherein:
each of the laminated layer sections has a substantially wedge shape.

5. The audio speaker of claim 1 wherein:
the magnet comprises an external ring magnet.

6. The audio speaker of claim 5 wherein:
the first magnetically conductive member comprises a top plate.

7. The audio speaker of claim 5 wherein:
the first magnetically conductive member comprises a pole plate.

8. The audio speaker of claim 7 wherein:
the pole plate comprises a laminated pole piece and a monolithic back plate coupled to the laminated pole piece.

9. The audio speaker of claim 7 wherein:
the second magnetically conductive member comprises a top plate which is comprised of a plurality of laminated layer sections which are magnetically coupled to but electrically insulated from each other.

10. The audio speaker of claim 1 wherein:
the magnet comprises an internal magnet.

11. The audio speaker of claim 10 wherein:
the first magnetically conductive member comprises a top plate.

12. The audio speaker of claim 11 wherein:
the first magnetically conductive member comprises a cup.

13. The audio speaker of claim 12 wherein:
the second magnetically conductive member comprises a top plate which is comprised of a plurality laminated layer sections which are magnetically coupled to but electrically insulated from each other.

14. The audio speaker of claim 1 wherein:
the magnet comprises an internal magnet; and
one of the first magnetically conductive member and the second magnetically conductive member comprises a tube yoke.

15. The audio speaker of claim 14 wherein:
the second magnetically conductive member comprises the tube yoke; and
the first magnetically conductive member comprises a pole piece.

16. The audio speaker of claim 14 wherein:
the first magnetically conductive member comprises the tube yoke.

17. The audio speaker of claim 16 wherein:
the second magnetically conductive member comprises a pole piece which is comprised of a plurality of laminated layer sections which are magnetically coupled to but electrically insulated from each other.

18. The audio speaker of claim 16 wherein the tube yoke comprises:
a plurality of substantially rectangular laminate layer sections coupled together.

19. The audio speaker of claim 18 wherein:
at least some of the substantially rectangular layer sections include holes through which a bolt may be passed from one layer section to a next layer section along an axis of the tube.

20. The audio speaker of claim 19 wherein:
the holes are formed through tabs extending from a main body of the layer section.

21. The audio speaker of claim 16 wherein:
the tube comprises a plurality of substantially V-shaped laminate layer sections coupled together; and
the top plate comprises a plurality of laminate layer sections coupled together.

22. The audio speaker of claim 21 wherein the plurality of laminate layer sections of the top plate comprises:
a plurality of one-piece top plate sections; and
a plurality of two-piece top plate sections.

23. The audio speaker of claim 22 wherein:
the one-piece top plate sections and the two-piece top plate sections include corresponding holes through each, extending along an axis of the tube.

24. The audio speaker of claim 14 further comprising:
an external magnet magnetically coupled to the tube; and
an external top plate magnetically coupled to the external magnet.

25. The audio speaker of claim 24 wherein:
the external top plate comprises a plurality of laminated layer sections which are magnetically conductive but electrically insulated from each other.

26. The audio speaker of claim 14 further comprising:
a collar magnetically coupled to the tube and defining the magnetic air gap with the pole piece.

27. The audio speaker of claim 14 wherein the tube comprises:
shoulders adjacent the diaphragm assembly.

28. The audio speaker of claim 1 wherein the second magnetically conductive member comprises a plurality of laminated layer sections which are magnetically coupled to but electrically insulated from each other.

29. The audio speaker of claim 28 wherein:
the laminated layer sections of the first magnetically conductive member are oriented in a different direction than the laminated layer sections of the second magnetically conductive member.

30. An audio speaker comprising:
a diaphragm assembly including a voice coil, wherein the voice coil has an axis of movement; and
a motor assembly including,
a first magnetically conductive member,
a first laminated structure in which a plurality of magnetically conductive sections are mechanically coupled together and electrically insulated from each other to prevent eddy currents which would otherwise be induced by an electrical current applied to the voice coil, wherein the magnetically conductive sections are electrically insulated from each other along boundaries substantially parallel to the axis of the voice coil, and a magnet magnetically coupled between the first magnetically conductive member and the laminated structure, wherein the first magnetically conductive member and the laminated structure define between them a magnetic air gap within which the voice coil is disposed.

31. The audio speaker of claim 30 wherein:
the first laminated structure comprises a top plate.

32. The audio speaker of claim 30 wherein:
the first laminated structure comprises a pole yoke.

33. The audio speaker of claim 30 wherein:
the first laminated structure comprises a cup yoke.

34. The audio speaker of claim 30 wherein:
the first laminated structure comprises a tube yoke.

35. The audio speaker of claim 30 wherein:
the first magnetically conductive member comprises a second laminated structure in which a plurality of magnetically conductive sections are mechanically coupled together and electrically insulated from each other to prevent eddy currents which would otherwise be induced by the electrical current applied to the voice coil.

36. The audio speaker of claim 35 wherein:
the magnetically conductive sections of the first laminated structure have a different orientation than the magnetically conductive sections of the second laminated structure.

37. An improvement in a electromagnetic motor structure which includes a magnetically conductive yoke, a magnetically conductive top plate defining a magnetic air gap with the yoke, and a permanent magnet magnetically coupled between the yoke and the top plate, wherein the improvement comprises:

at least one of the yoke and the top plate being comprised of multiple components laminated together so as to be electrically insulated from each other, wherein the multiple components are laminated at boundaries substantially parallel to an axis of the electromagnetic motor structure;

whereby the at least one of the yoke and the top plate which is laminated has a significantly reduced susceptibility to eddy currents being induced therein by a varying magnetic flux field from a voice coil in the magnetic air gap.

38. The improvement in the electromagnetic motor structure of claim 37, wherein the improvement further comprises:
the multiple laminated components each having one of a substantially flat shape and a substantially wedge shape.

39. The improvement in the electromagnetic motor structure of claim 37, wherein the improvement further comprises:
both the yoke and the top plate being so laminated.

40. The improvement in the electromagnetic motor structure of claim 37, wherein the improvement further comprises:
the yoke comprising one of a cup, a pole plate, and a tube.

41. A method of operating an audio speaker to move a diaphragm in response to an alternating current electrical signal applied to the speaker, the method comprising:

(A) conducting magnetic flux from a magnet, thence through a first magnetically conductive member, over a magnetic air gap, thence through a second magnetically conductive member, and thence back to the magnet, (B) conducting the electrical signal through a voice coil which is disposed within the magnetic air gap and wound around a bobbin which is coupled to the diaphragm;

(C) in response to the electrical signal being conducted through the voice coil, moving the voice coil under electromotive force in response to the presence of the magnetic flux across the magnetic air gap; and (D) substantially preventing eddy current in at least one of the first and second magnetically conductive members, by virtue of the at least one of the first and second magnetically conductive members comprising a laminated structure of electrically insulated magnetically conductive sections, which eddy current would otherwise be induced by the electrical signal being conducted through the voice coil, wherein eddy currents induced by the voice coil are interrupted at boundaries between adjoining ones of the magnetically conductive sections, wherein the boundaries are substantially parallel to an axis of movement of the voice coil.

42. The method of claim 41 further comprising:
holding the laminated structure together with at least one bolt passed through corresponding holes which extend through the respective electrically insulated magnetically conductive sections.

* * * * *